United States Patent
Nagatomi et al.

(10) Patent No.: US 8,040,779 B2
(45) Date of Patent: Oct. 18, 2011

(54) OPTICAL PICKUP DEVICE AND OPTICAL DISC DEVICE

(75) Inventors: Kenji Nagatomi, Kaizu (JP); Katsutoshi Hibino, Kaizu (JP)

(73) Assignee: Sanyoelectric Co., Ltd., Osaka (JP)

( * ) Notice: Subject to any disclaimer, the term of this patent is extended or adjusted under 35 U.S.C. 154(b) by 0 days.

(21) Appl. No.: 12/844,261

(22) Filed: Jul. 27, 2010

(65) Prior Publication Data

US 2011/0026389 A1 Feb. 3, 2011

(30) Foreign Application Priority Data

Jul. 31, 2009 (JP) ................................ 2009-178709

(51) Int. Cl.
*G11B 7/135* (2006.01)
(52) U.S. Cl. .......... 369/112.03; 369/112.12; 369/112.15
(58) Field of Classification Search ............. 369/112.03, 369/112.12, 112.15, 112.22, 44.41, 120
See application file for complete search history.

(56) References Cited

U.S. PATENT DOCUMENTS

| | | | | |
|---|---|---|---|---|
| 2007/0104072 A1* | 5/2007 | Ogata | | 369/112.16 |
| 2007/0268807 A1* | 11/2007 | Kimura et al. | | 369/112.16 |
| 2008/0094948 A1* | 4/2008 | Kamisada et al. | | 369/44.11 |
| 2008/0137513 A1* | 6/2008 | Mori et al. | | 369/109.01 |
| 2008/0267019 A1* | 10/2008 | Kimura et al. | | 369/44.12 |
| 2009/0225645 A1* | 9/2009 | Nagatomi | | 369/112.23 |

FOREIGN PATENT DOCUMENTS

| | | |
|---|---|---|
| JP | 2006-252716 A | 9/2006 |
| JP | 2006-260669 A | 9/2006 |
| JP | 2008-171470 A | 7/2008 |

OTHER PUBLICATIONS

Explanation of Circumstances filed in the corresponding Japanese Application No. 2009-178709, filed Dec. 21, 2010, pp. 1-11, Japan.

* cited by examiner

*Primary Examiner* — Joseph Feild
*Assistant Examiner* — Nicholas Lee
(74) *Attorney, Agent, or Firm* — Ditthavong Mori & Steiner, P.C.

(57) ABSTRACT

An optical pickup device includes an astigmatism element which sets focal line positions to be defined by convergence of laser light away from each other, a diffraction element which diffracts four light fluxes obtained by a light flux of the laser light to disperse the four light fluxes from each other, and a photodetector having a first sensing section and a second sensing section which respectively receive m-th order diffraction light and n-th order diffraction light of the four light fluxes. In this arrangement, the first sensing section receives eight light fluxes obtained by dividing the four light fluxes of the m-th order diffraction light by two straight lines to output detection signals of the number less than eight.

10 Claims, 16 Drawing Sheets

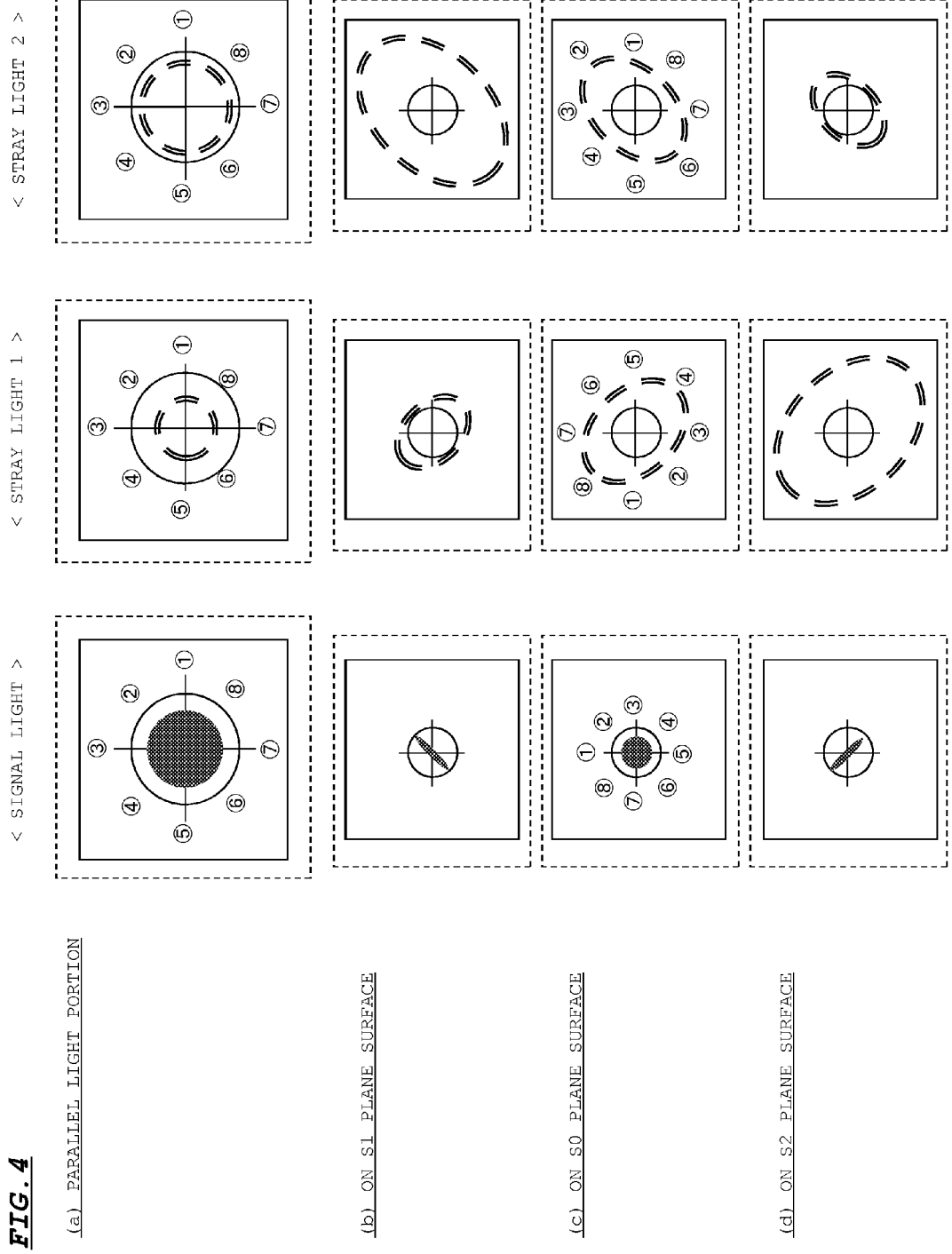

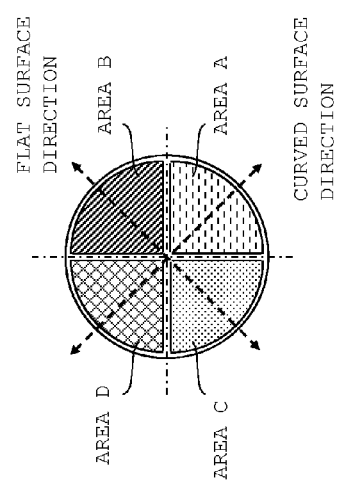
FIG.5B   SIGNAL LIGHT
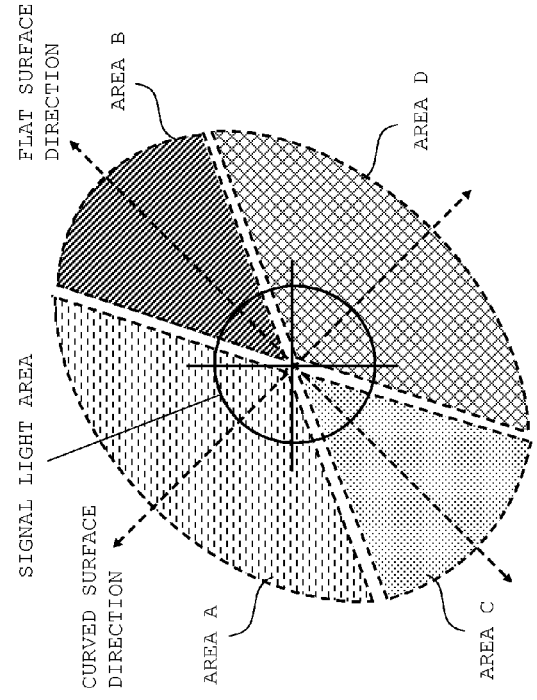
FIG.5D   STRAY LIGHT 2
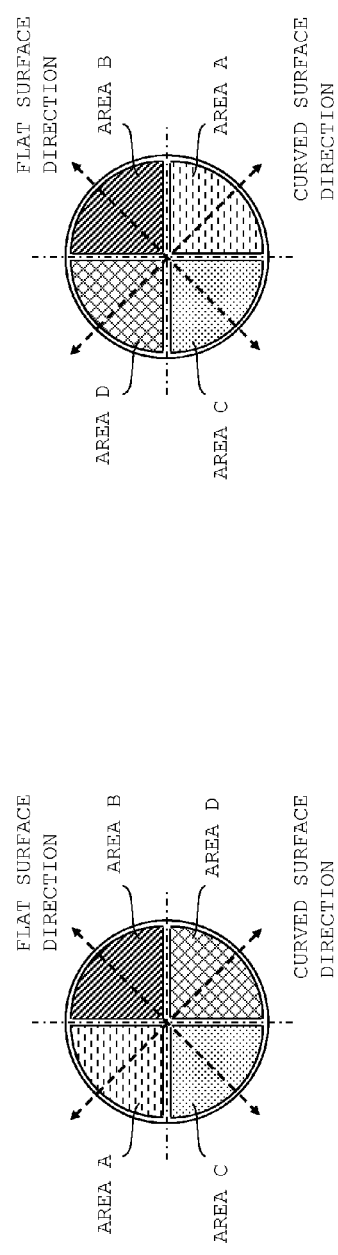
FIG.5A   LIGHT FLUX DIVIDING PATTERN
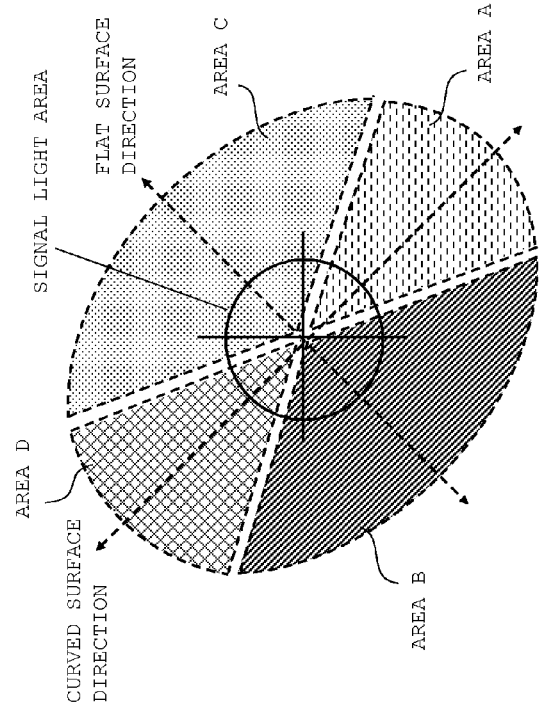
FIG.5C   STRAY LIGHT 1

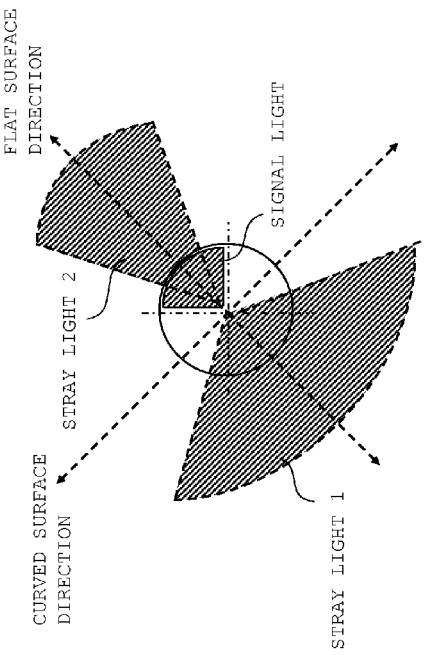
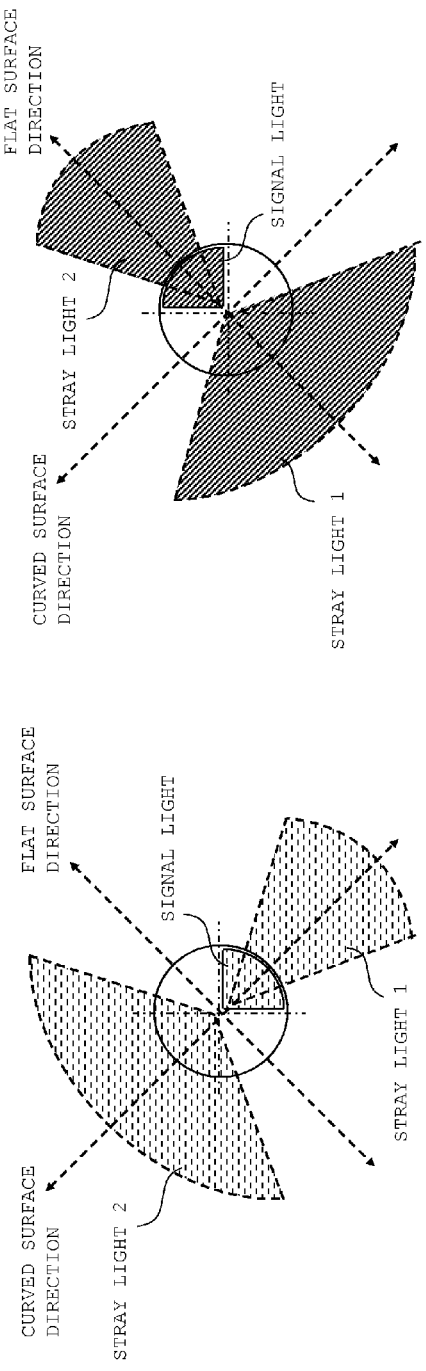
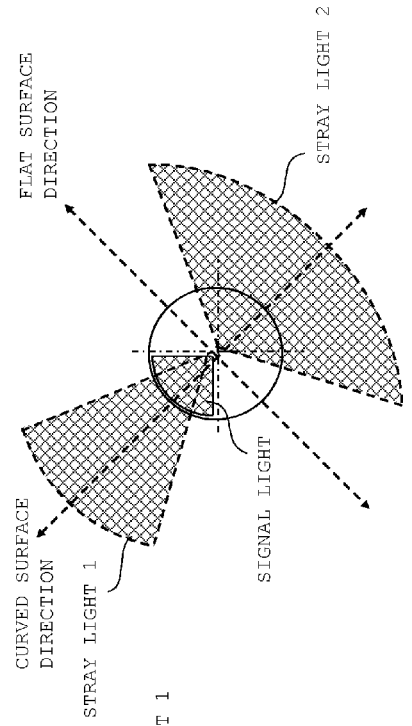
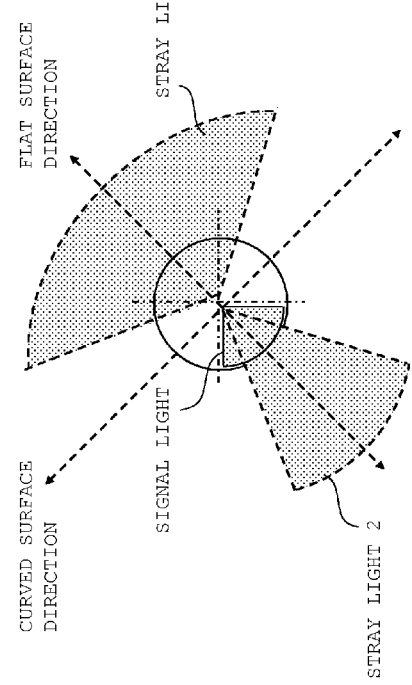

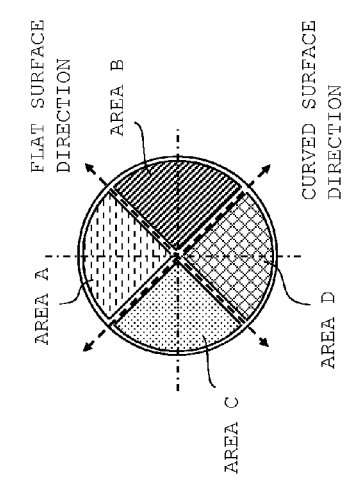
FIG. 7A  LIGHT FLUX DIVIDING PATTERN
FIG. 7B  SIGNAL LIGHT
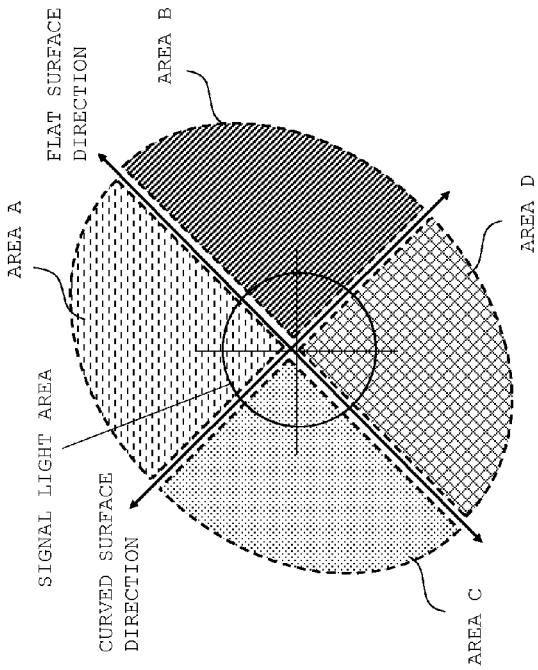
FIG. 7C  STRAY LIGHT 1
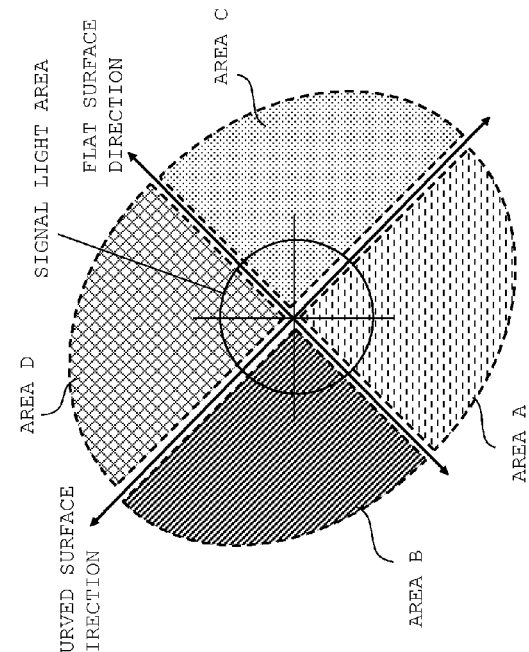
FIG. 7D  STRAY LIGHT 2

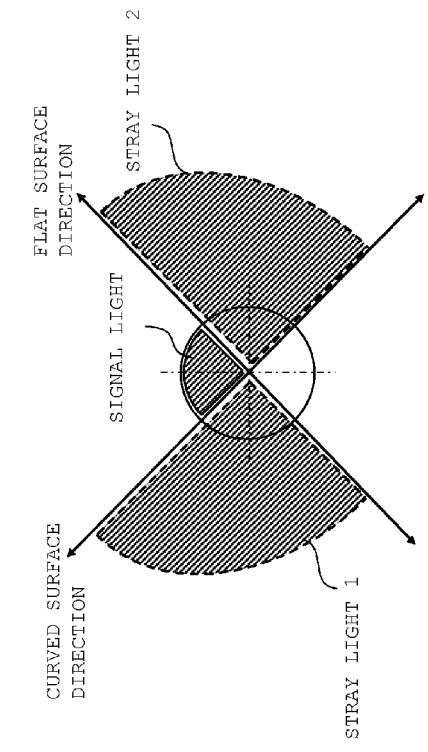
FIG. 8A  LIGHT FLUX STATE IN AREA A
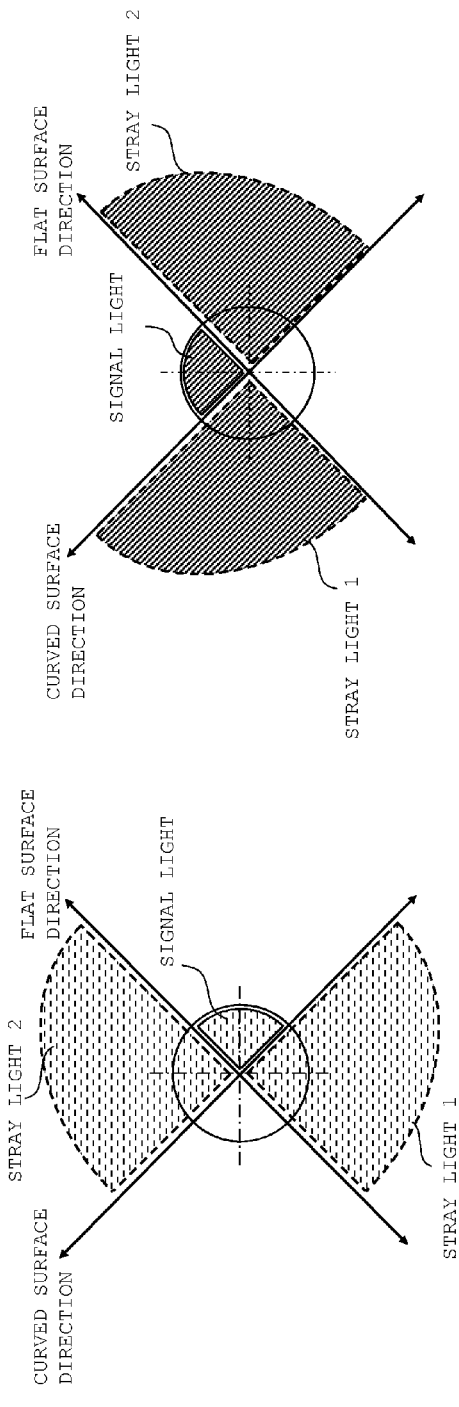
FIG. 8B  LIGHT FLUX STATE IN AREA B
FIG. 8C  LIGHT FLUX STATE IN AREA C
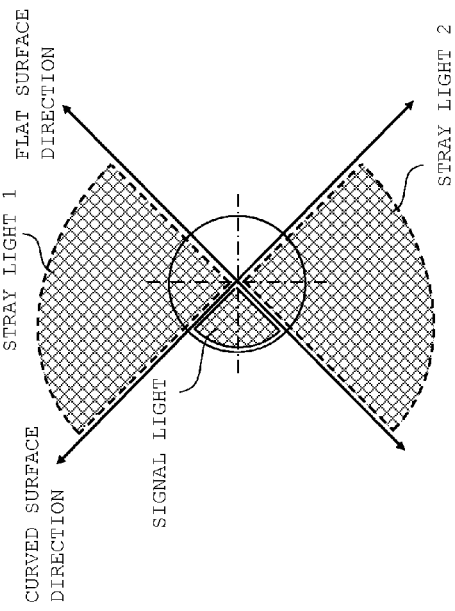
FIG. 8D  LIGHT FLUX STATE IN AREA D
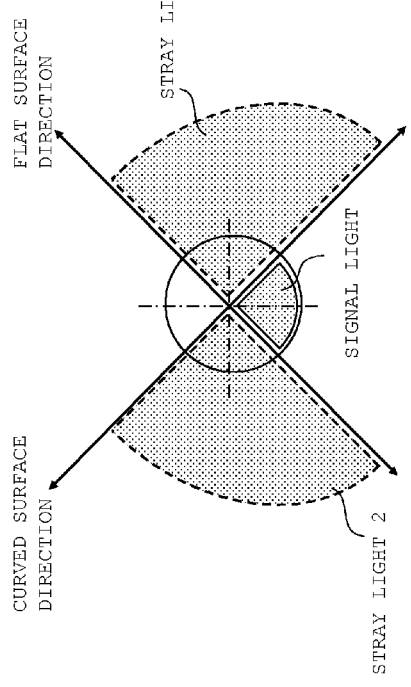

LIGHT FLUX ON PLANE S0

PROVIDE ANGLAR CHANGE TO EACH AREA

FE = (A+B+E+F) - (C+D+G+H)
PP = (A+B+G+H) - (C+D+E+F)

FE = (A+B+E+F) - (C+D+G+H)
PP = (A+B+G+H) - (C+D+E+F)

OPTICAL PICKUP DEVICE AND OPTICAL DISC DEVICE

This application claims priority under 35 U.S.C. Section 119 of Japanese Patent Application No. 2009-178709 filed Jul. 31, 2009, entitled "OPTICAL PICKUP DEVICE AND OPTICAL DISC DEVICE". The disclosure of the above applications is incorporated herein by reference.

BACKGROUND OF THE INVENTION

1. Field of the Invention

The present invention relates to an optical pickup device and an optical disc device, and more particularly to a technology adapted to record/reproduce with respect to a recording medium having laminated recording layers.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

As a method for removing stray light, there is proposed a method using a pinhole. In this method, a pinhole is formed at a position where signal light is converged. In this method, an unwanted stray light component entered into a photodetector can be reduced, because a part of stray light is blocked by the pinhole. There is proposed a method using a half wavelength plate and a polarizing optical element in combination, as another method for removing stray light. In this method, a polarization direction of stray light is changed by the half wavelength plate, and the stray light is blocked by the polarizing optical element. This enables to prevent an unwanted stray light component from being entered into a photodetector.

However, in the method for removing stray light using a pinhole, it is necessary to accurately position the pinhole at a position where laser light (signal light) reflected on a targeted recording layer is converged. In this method, therefore, it is difficult to adjust the position of the pinhole. If the size of the pinhole is increased to easily adjust the position of the pinhole, stray light is more likely to pass through the pinhole, which obstructs the effect of suppressing signal deterioration resulting from stray light.

In the method for removing stray light by combined use of a half wavelength plate and a polarizing optical element, each two half wavelength plates and polarizing optical elements are necessary. In addition, two lenses are necessary to remove stray light. Thus, the number of parts and the cost are increased. Further, it is cumbersome to adjust the arrangement positions of these members. Furthermore, it is necessary to secure a space for arranging these members side by side, which may increase the size of an optical system.

In the case where a recording/reproducing operation is performed with respect to an optical disc of the above type, a servo signal such as a focus error signal and a tracking error signal is generated, in addition to a reproduction RF signal, based on current signals to be outputted from a photodetector. The photodetector includes a plurality of sensors divided each other so that a servo signal can be generated. Current signals to be outputted from the respective sensors are subjected to amplification and voltage conversion by I/V amplifiers. A reproduction RF signal and a servo signal are generated by summation and subtraction of voltage signals obtained by the above process.

However, an inherent noise is generated in the I/V amplifiers at the time of I/V conversion. The noise may be superimposed on voltage signals from the respective sensors. As a result, a reproduction RF signal and a servo signal may be deteriorated resulting from the noise.

In particular, since a reproduction RF signal is generated by summation of all the voltage signals from the sensors, all the noises generated in the I/V amplifiers may be superimposed on the reproduction RF signal. On the other hand, since the frequency of a reproduction RF signal is high, as compared with a servo signal, deterioration of an electrical characteristic of the reproduction RF signal is large, as compared with the servo signal. The deterioration becomes conspicuous, as the recording/reproducing speed is increased. If a noise resulting from an I/V amplifier is superimposed on a reproduction RF signal whose electrical characteristic is likely to be deteriorated, the S/N ratio of the reproduction RF signal may be seriously lowered. If the deterioration of the reproduction RF signal progresses, it may be impossible or difficult to compensate for the deterioration by an error correction circuit provided posterior to the I/V amplifiers. In view of the above, it is necessary to provide a measure for suppressing noise resulting from the I/V amplifiers particularly with respect to a reproduction RF signal.

SUMMARY OF THE INVENTION

A first aspect of the invention is directed to an optical pickup device. The optical pickup device according to the first aspect includes a laser light source; an objective lens which converges laser light emitted from the laser light source on a recording medium; an astigmatism element which imparts astigmatism to the laser light reflected on the recording medium to set a first focal line position to be defined by convergence of the laser light in a first direction, and a second focal line position to be defined by convergence of the laser light in a second direction perpendicular to the first direction away from each other in a propagating direction of the laser light; a diffraction element which diffracts four light fluxes obtained by dividing a light flux of the laser light reflected on the recording medium by a first straight line and a second straight line respectively in parallel to the first direction and the second direction to disperse the four diffracted light fluxes from each other; and a photodetector including a first sensing section and a second sensing section which respectively receive m-th order diffraction light and n-th order diffraction light (where m≠n) of the four light fluxes. In this arrangement, the first sensing section is configured to receive eight light fluxes obtained by dividing the four light fluxes of the m-th order diffraction light by two straight lines respectively intersecting with the first straight line and the second straight line by 45° to output detection signals of the number less than eight.

A second aspect of the invention is directed to an optical disc device. The optical disc device according to the second aspect includes the optical pickup device according to the first aspect, and a signal processor which converts a detection signal to be outputted from the first sensing section and a detection signal to be outputted from the second sensing section into voltage signals, and performs computation with respect to the voltage signals. In this arrangement, the signal processor includes a reproduction signal generating section which generates a reproduction RF signal, based on the voltage signals derived from the detection signal from the first sensing section.

BRIEF DESCRIPTION OF THE DRAWINGS

These and other objects, and novel features of the present invention will become more apparent upon reading the following detailed description of the embodiment along with the accompanying drawings.

FIG. 4 is a diagram for describing the technical principle (as to how light rays propagate) in the embodiment.

FIGS. 5A through 5D are diagrams for describing the technical principle (an area dividing pattern and a light flux distribution) in the embodiment.

FIGS. 6A through 6D are diagrams for describing the technical principle (an area dividing pattern and a light flux distribution) in the embodiment.

FIGS. 7A through 7D are diagrams for describing the technical principle (an area dividing pattern and a light flux distribution) in the embodiment.

FIGS. 8A through 8D are diagrams for describing the technical principle (an area dividing pattern and a light flux distribution) in the embodiment.

Figure 1B:
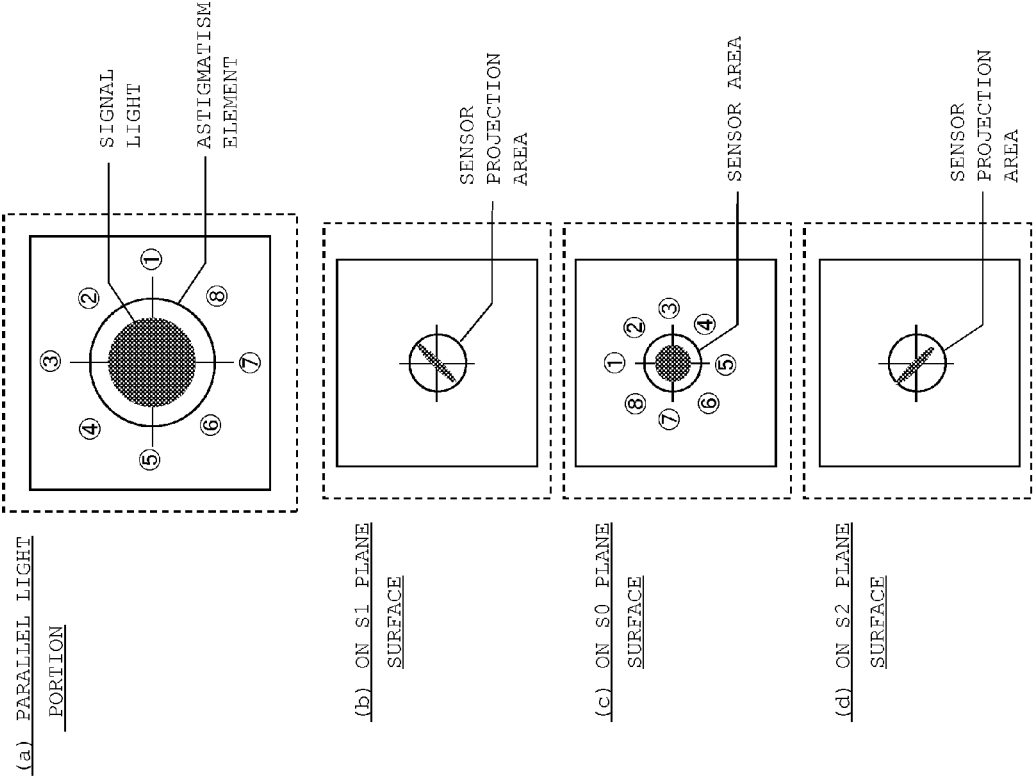
FIGS. 1A and 1B are diagrams for describing a technical principle (as to how light rays propagate) in an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings. A sensing portion in the embodiment corresponds to a sensor in the claims.

Technical Principle

First, a technical principle to which the embodiment of the invention is applied is described referring to FIGS. 1A through 10D.

Figure 1A:
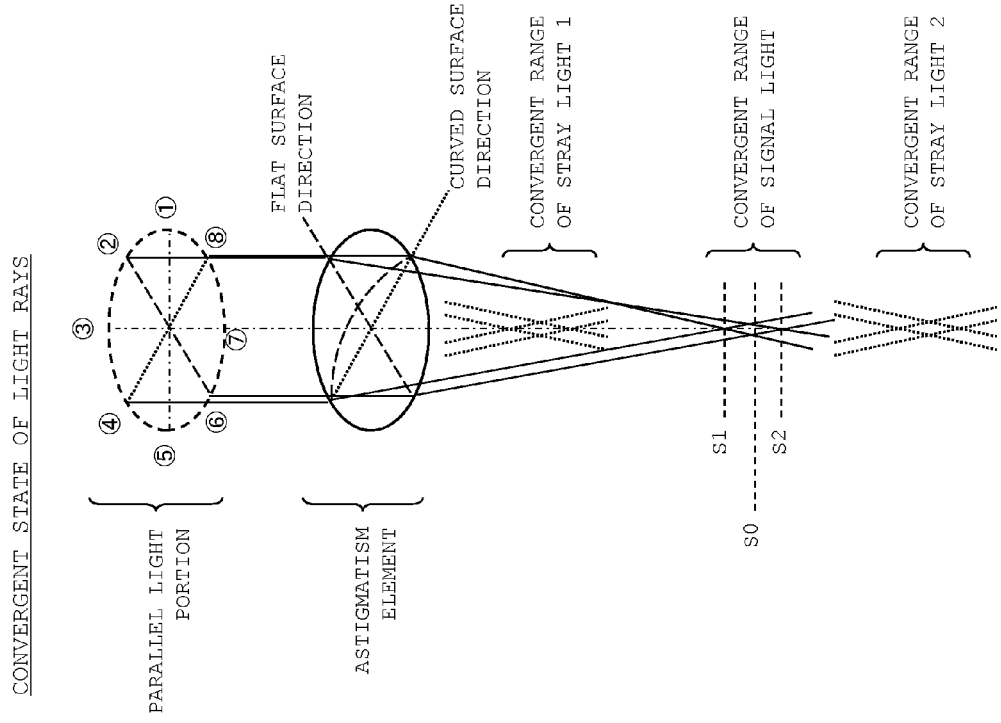

FIG. 1A is a diagram showing a convergent state of signal light and stray light, in the case where laser light (signal light) reflected on a targeted recording layer is entered into an astigmatism element such as an anamorphic lens as parallel light. "Stray light 1" is laser light reflected on a recording layer adjacent to the targeted recording layer at a rearward position of the target recording layer with respect to the laser light incident side, and "stray light 2" is laser light reflected on a recording layer adjacent to the targeted recording layer at a forward position of the targeted recording layer with respect to the laser light incident side. FIG. 1A shows a state that signal light is focused on the targeted recording layer.

As shown in FIG. 1A, a focal line is defined on a plane S1 by convergence of signal light in a "curved surface direction" in FIG. 1A, and a focal line is defined on a plane S2 by convergence of signal light in a "flat surface direction" perpendicular to the curved surface direction, by the function of the anamorphic lens. Then, the spot of signal light is minimized (a least circle of confusion is defined) on a plane S0 between the plane S1 and the plane S2. In focus adjustment based on an astigmatism method, a light receiving surface of a photodetector is disposed on the plane S0. In this example, to simplify the description on the astigmatism function by the anamorphic lens, the terms "curved surface direction" and "flat surface direction" are used. Actually, however, as far as the anamorphic lens has a function of defining focal lines at different positions from each other, the anamorphic lens may have a curvature in the "flat surface direction" shown in FIG. 1A. In the case where laser light is entered into the anamorphic lens in a convergence state, the shape of the anamorphic lens in the "flat surface direction" may be linear (curvature radius=∞).

As shown in FIG. 1A, the focal line position of stray light 1 (in FIG. 1A, a range between two focal line positions defined by the astigmatism element is referred to as a "convergent range") is closer to the astigmatism element with respect to the focal line position of signal light; and the focal line position of stray light 2 is away from the astigmatism element with respect to the focal line position of signal light.

The sections (a) through (d) in FIG. 1B are diagrams respectively showing beam configurations of signal light on a parallel light portion, and the planes S1, S0, and S2. Signal light entered into the astigmatism element in the shape of a true circle is converted into light of an elliptical shape on the plane S1, and converted into light of a substantially true circle on the plane S0, and then converted into light of an elliptical shape on the plane S2. In this example, the beam configuration on the plane S1 and the beam configuration on the plane S2 have such a relation that the major axes of the beams are perpendicular to each other.

In this example, as shown in FIG. 1A and the section (a) in FIG. 1B, in the case where eight positions (positions 1 through 8: in FIGS. 1A and 1B, the positions 1 through 8 are indicated by the numbers enclosed by a circle) are defined counterclockwise on the outer periphery of the beam on the parallel light portion, light rays passing the positions 1 through 8 are each subjected to convergence by the astigmatism element. The position 4 and the position 8 are located on a parting line dividing a beam section of the parallel light portion into two parts by a straight line that is in parallel to the curved surface direction, and the position 2 and the position 6 are located on a parting line dividing the beam section of the parallel light portion into two parts by a straight line that is in parallel to the flat surface direction. The positions 1, 3, 5, and 7 are located on mid positions of an arc portion of the outer perimeter respectively defined by the positions 2, 4, 6, and 8.

Light rays passing the positions 4 and 8 on the parallel light portion are converged into a focal line in the curved surface direction on the plane S1, and entered into the plane S0. Accordingly, the light rays passing the positions 4 and 8 on the parallel light portion pass the positions 4 and 8 shown in the section (c) of FIG. 1B on the plane S0. Similarly, the light rays passing the positions 1, 3, 5, and 7 on the parallel light portion are converged into a focal line in the curved surface direction on the plane S1, and entered into the plane S0. Accordingly, the light rays passing the positions 1, 3, 5, and 7 on the parallel light portion pass the positions 1, 3, 5, and 7 shown in the section (c) of FIG. 1B on the plane S0. On the other hand, the light rays passing the positions 2 and 6 on the parallel light portion are entered into the plane S0 without convergence into a focal line in the curved surface direction on the plane S1. Accordingly, the light rays passing the positions 2 and 6 on the parallel light portion pass the positions 2 and 6 shown in the section (c) of FIG. 1B on the plane S0.

Figure 2B:
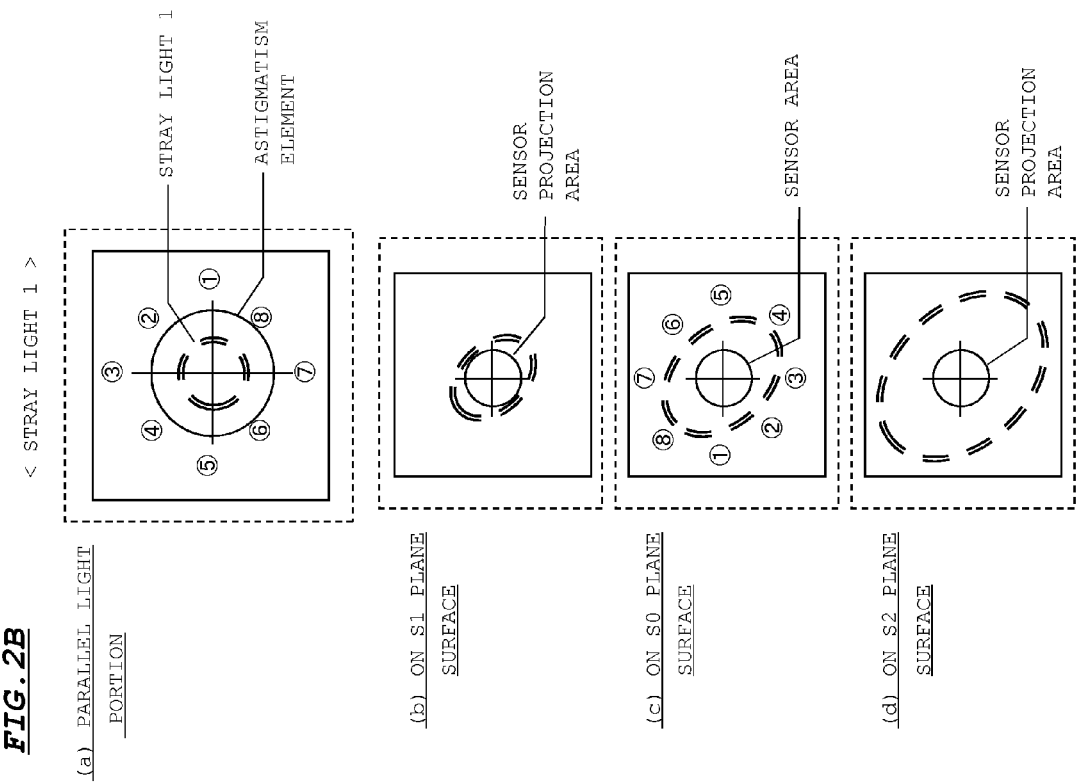
FIGS. 2A and 2B are diagrams for describing the technical principle (as to how light rays propagate) in the embodiment.
Figure 2A:
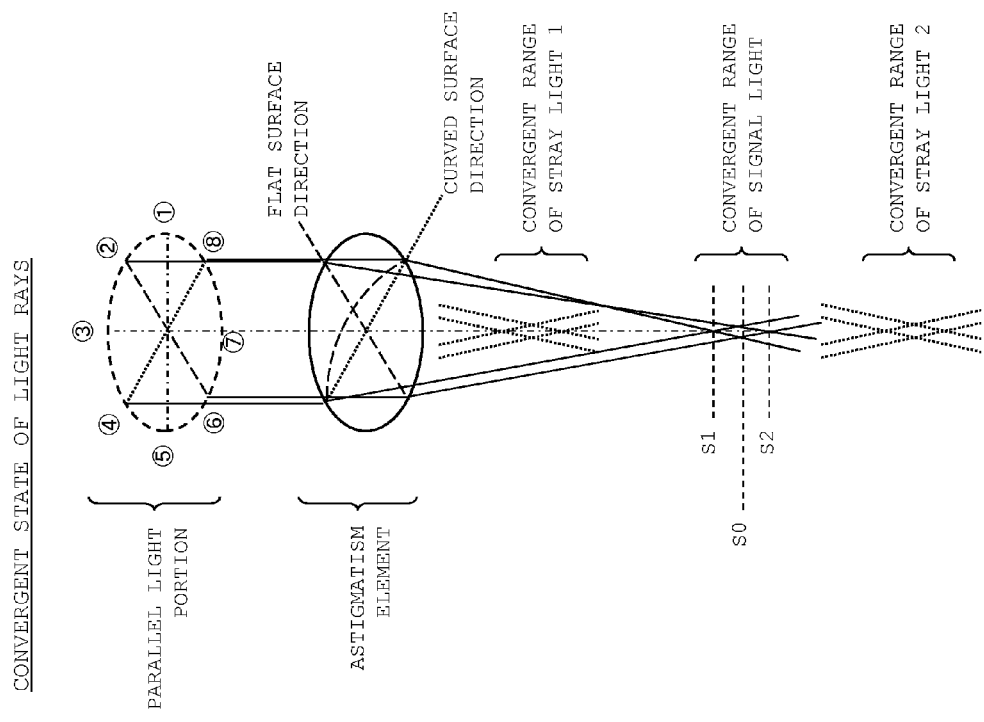

Sections (a) through (d) in FIG. 2B are diagrams respectively showing beam configurations and light ray passing positions of stray light 1 on the parallel light portion, and the planes S1, S0, and S2. As shown in the section (a) of FIG. 2B, similarly to the signal light, in the case where eight positions 1 through 8 are defined on the outer periphery of stray light 1, light rays passing the eight positions 1 through 8 on the parallel light portion are converged into a focal line in the curved surface direction or a focal line in the flat surface direction, and entered into the plane S0. Accordingly, the light rays passing the positions 1 through 8 on the parallel light portion respectively pass the positions 1 through 8 shown in the section (c) of FIG. 2B on the plane S0.

Figure 3B:
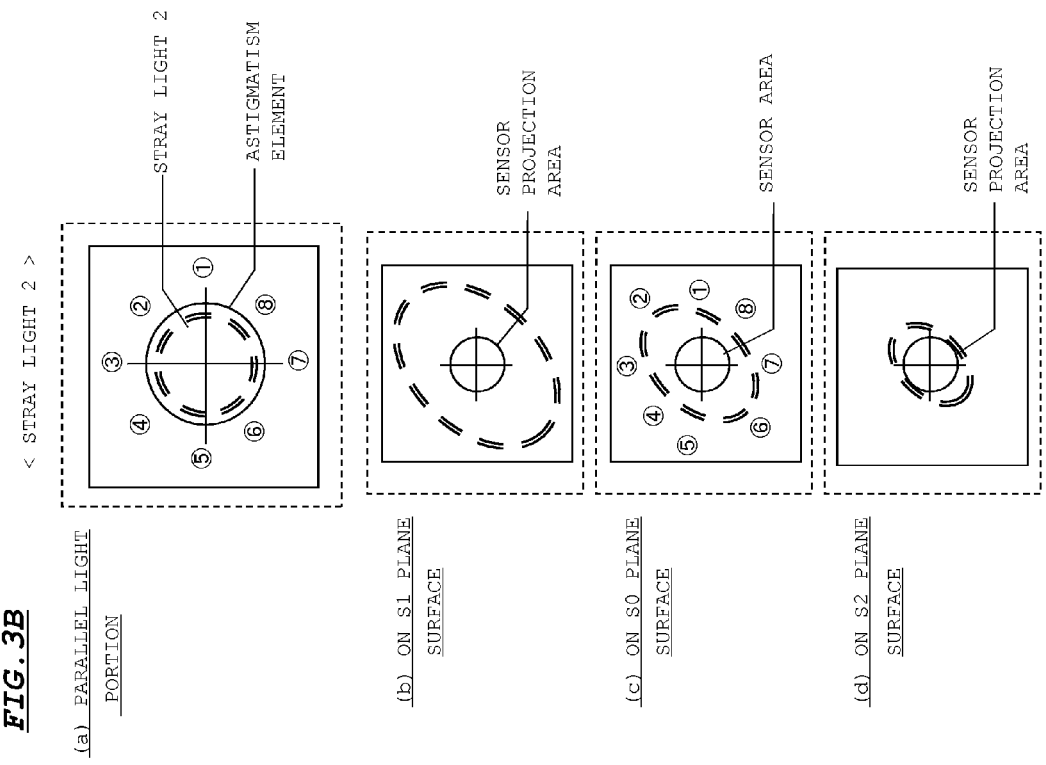
FIGS. 3A and 3B are diagrams for describing the technical principle (as to how light rays propagate) in the embodiment.
Figure 3A:
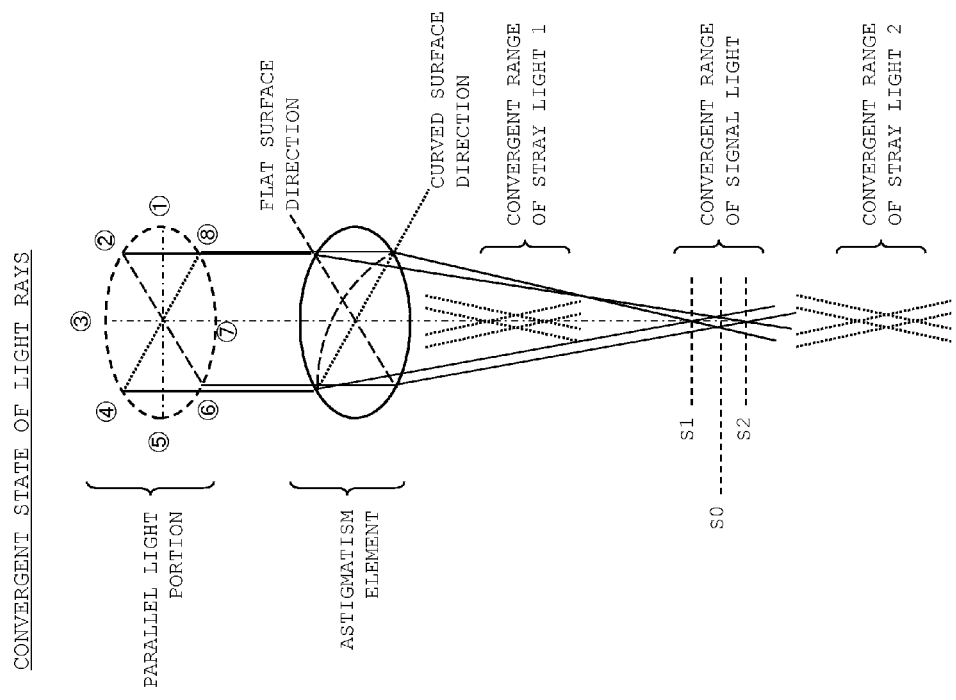

Sections (a) through (d) in FIG. 3B are diagrams respectively showing beam configurations and light ray passing positions of stray light 2 on the parallel light portion, and the planes S1, S0, and S2. As shown in the section (a) of FIG. 3B, similarly to the signal light, in the case where eight positions 1 through 8 are defined on the outer periphery of stray light 2, light rays passing the eight positions 1 through 8 on the parallel light portion are entered into the plane S0, without convergence into a focal line in the curved surface direction or a focal line in the flat surface direction. Accordingly, the light rays passing the positions 1 through 8 on the parallel light portion respectively pass the positions 1 through 8 shown in the section (c) of FIG. 3B on the plane S0.

FIG. 4 shows diagrams of the beam configurations and the light ray passing positions of signal light, stray light 1, and stray light 2 on the parallel light portion, and the planes S1, S0, and S2 in comparison with each other. As is obvious from the comparison between the diagrams in the section (c) of FIG. 4, light fluxes of signal light, stray light 1, and stray light 2 that have passed the position 1 on the parallel light portion respectively pass the different outer peripheral positions from each other on the plane S0. Likewise, light fluxes of signal light, stray light 1, and stray light 2 that have passed the positions 3, 4, 5, 7, and 8 on the parallel light portion respectively pass the different outer peripheral positions from each other on the plane S0. The light fluxes of signal light and stray light 2 that have passed the positions 2 and 6 on the parallel light portion respectively pass the corresponding same outer peripheral positions on the plane S0. In this case, the light fluxes of signal light and stray light 1 that have passed the positions 2 and 6 on the parallel light portion respectively pass the different outer peripheral positions from each other on the plane S0, and the light fluxes of stray light 1 and stray light 2 that have passed the positions 2 and 6 on the parallel light portion respectively pass the different outer peripheral positions from each other on the plane S0.

Next, a relation between an area dividing pattern of signal light, stray light 1, and stray light 2 on the parallel light portion, and an irradiation area of signal light, stray light 1, and stray light 2 on the plane S0 is investigated, considering the above phenomenon.

First, as shown in FIG. 5A, let it be assumed that signal light, stray light 1, and stray light 2 on the parallel light portion are each divided into four light flux areas A through D by two straight lines respectively inclined with respect to the flat surface direction and the curved surface direction by 45 degrees. This dividing pattern corresponds to an area dividing based on a conventional astigmatism method.

By the area dividing, signal light in the light flux areas A through D has a distribution on the plane S0 as shown in FIG. 5B due to the above phenomenon. Stray light 1 and stray light 2 in the light flux areas A through D respectively have distributions on the plane S0 as shown in FIGS. 5C and 5D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 6A through 6D. In this case, the signal light in each of the light flux areas is necessarily superimposed on one of the stray light 1 and the stray light 2 in the corresponding same light flux area. Accordingly, if the signal light in each of the light flux areas is received by a sensing portion on the photodetector, at least the stray light 1 or the stray light 2 in the corresponding light flux area is simultaneously entered into the corresponding sensing portion, which may deteriorate a detection signal.

In contrast, as shown in FIG. 7A, let it be assumed that signal light, stray light 1, and stray light 2 on the parallel light portion are each divided into four light flux areas A through D by two straight lines, which are respectively in parallel to the flat surface direction and the curved surface direction. Then, signal light in the light flux areas A through D has a distribution on the plane S0 as shown in FIG. 7B due to the above phenomenon. Stray light 1 and stray light 2 in the light flux areas A through D respectively have distributions on the plane S0, as shown in FIGS. 7C and 7D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 8A through 8D. In this case, the signal light in each of the light flux areas is not superimposed with any one of the stray light 1 and the stray light 2 in the corresponding light flux area. Accordingly, if only the signal light is allowed to be received by a sensing portion, after the light fluxes (of signal light, stray light 1, and stray light 2) in each of the light flux areas are dispersed in different directions from each other, only the signal light is allowed to be entered into the corresponding sensing portion to thereby prevent incidence of stray light. Thus, deterioration of a detection signal resulting from stray light can be avoided.

As described above, dividing signal light, stray light 1, and stray light 2 each into four light flux areas A through D by two straight lines, which are respectively in parallel to the flat surface direction and the curved surface direction, and dispersing the light passing through the light flux areas A through D away from each other on the plane S0 enables to extract only the signal light. This embodiment is made based on the above principle.

Figure 9B:
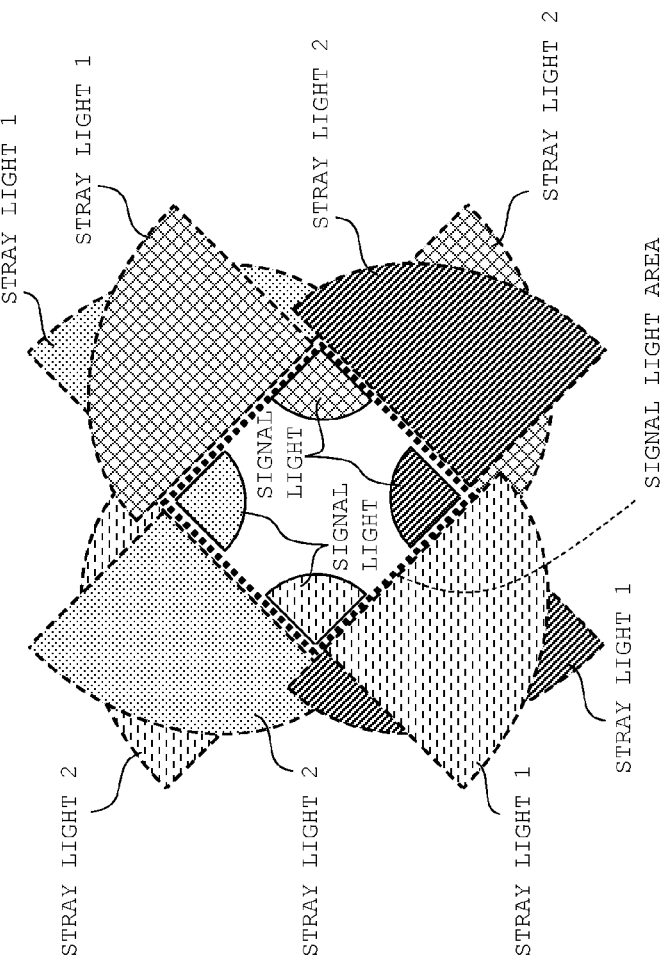
FIGS. 9A and 9B are diagrams for describing the technical principle (an angle changing function and a light flux distribution) in the embodiment.
Figure 9A:
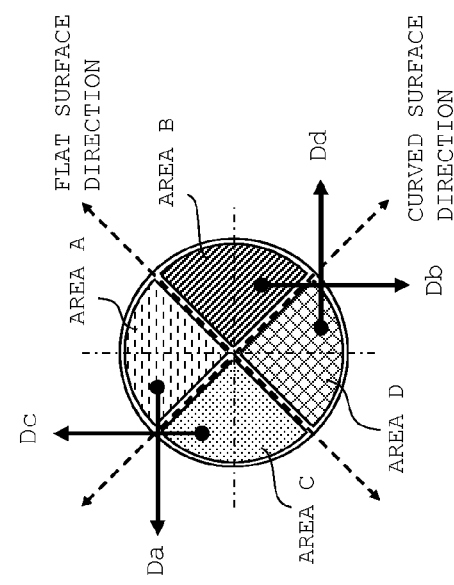

FIGS. 9A and 9B are diagrams showing distribution states of signal light, stray light 1, and stray light 2 on the plane S0, in the case where propagating directions of light fluxes (of signal light, stray light 1, and stray light 2) passing the four light flux areas A through D shown in FIG. 7A are changed from each other by a predetermined angle. In this example, as shown in FIG. 9A, the propagating directions of light fluxes (of signal light, stray light 1, and stray light 2) passing the four light flux areas A through D are respectively changed into directions Da, Db, Dc, and Dd by a predetermined angle amount α (not shown). The directions Da, Db, Dc, and Dd are inclined with respect to each of the flat surface direction and the curved surface direction by 45 degrees.

In this example, adjusting the angle amount α with respect to the directions Da, Db, Dc, and Dd enables to distribute the signal light, the stray light 1, and the stray light 2 in each of the light flux areas on the plane S0, as shown in FIG. 9B. As a result, as shown in FIG. 9B, a signal light area where only the signal light exists can be defined on the plane S0. Setting a sensing portion of the photodetector on the signal light area allows only the signal light in each of the light flux areas to be received on the corresponding sensing portion.

Figure 10A:
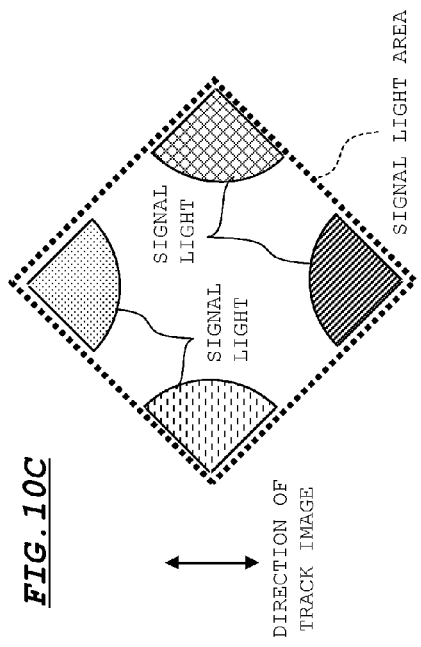
FIGS. 10A through 10D are diagrams showing a method for arranging a sensing portion in the embodiment.
Figure 10C:
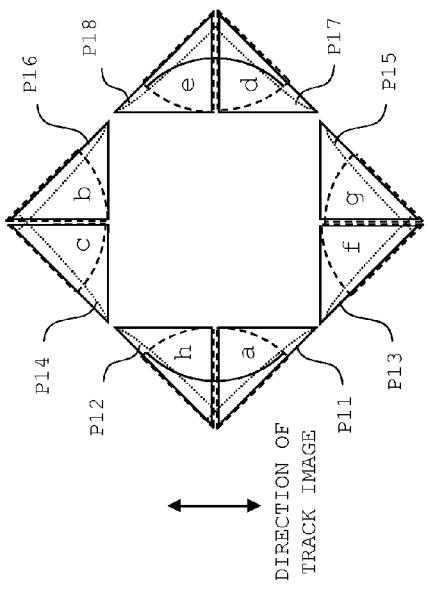
Figure 10B:
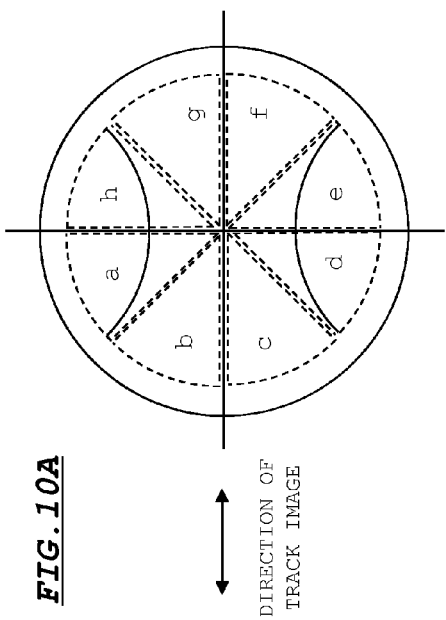
Figure 10D:
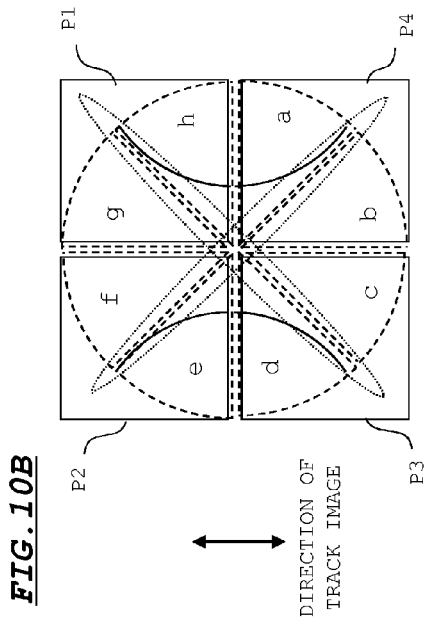

FIGS. 10A through 10D are diagrams for describing a method for arranging a sensing portion. FIGS. 10A and 10B are diagrams showing a light flux dividing method and a sensing portion based on a conventional astigmatism method. FIGS. 10C and 10D are diagrams showing a light flux dividing method and a sensing portion based on the above principle. In this example, a track direction is inclined with respect to each of the flat surface direction and the curved surface direction by 45 degrees. To simplify the description, a light flux is divided into eight light flux areas "a" through "h" in FIGS. 10A and 10B. Diffraction images (track images) by a track groove are indicated by the solid lines, and beam configurations in an out-of-focus state are indicated by the dotted lines in FIGS. 10A and 10B.

It is known that a superimposed state of a zero-th order diffraction image and a first order diffraction image of signal light resulting from a track groove is obtained by (track pitch× NA of objective lens). As shown in FIGS. 10A, 10B, and 10D, a condition for forming a first order diffraction image within the four light flux areas "a", "d", "e", and "h" is expressed by: wavelength/(track pitch×NA of objective lens)>√2.

In the conventional astigmatism method, sensing portions P1 through P4 (a four-division sensor) of a photodetector are set as shown in FIG. 10B. In this arrangement, assuming that detection signal components based on the light intensities of the light flux areas "a" through "h" are expressed by A through H, a focus error signal FE and a push-pull signal PP are obtained by the equations (1) and (2).

$$FE=(A+B+E+F)-(C+D+G+H) \quad (1)$$

$$PP=(A+B+G+H)-(C+D+E+F) \quad (2)$$

On the other hand, in the distribution state shown in FIG. 9B, as described above, signal light is distributed in the state as shown in FIG. 10C within the signal light area. In this case, the signal light passing the light flux areas "a" through "h" in FIG. 10A is as shown in FIG. 10D. Specifically, the signal light passing the light flux areas "a" through "h" in FIG. 10A is guided to the light flux areas "a" through "h" shown in FIG. 10D on the plane S0 where the sensing portion of the photodetector is disposed.

Accordingly, setting the sensing portions P11 through P18 at the positions of the light flux areas "a" through "h" shown in FIG. 10D in the superimposed state shown in FIG. 10D enables to generate a focus error signal and a push-pull signal by performing the same computation as applied in FIG. 10B. Specifically, assuming that detection signals from the sensing portions which receive light fluxes in the light flux areas "a" through "h" are expressed by A through H, similarly to the arrangement shown in FIG. 10B, a focus error signal FE and a push-pull signal PP can be obtained by performing computation in accordance with the equation (1) and (2).

As described above, according to the above principle, dividing each of the signal light, the stray light 1, and the stray light 2 on the parallel light portion into four light flux areas A through D by two straight lines, which are respectively in parallel to the flat surface direction and the curved surface direction shown in FIG. 1A; dispersing the light passing the light flux areas A through D; and allowing the signal light in each of the light flux areas A through D after dispersion to be individually received by two sensing portions enable to generate a focus error signal and a push-pull signal (a tracking error signal) by performing the same computation as applied to the process based on the conventional astigmatism method.

In an actual optical system, detection signals to be outputted from eight sensing portions shown in FIG. 10D are outputted to a posterior circuit after having undergone I/V amplifiers corresponding to the respective sensing portions. Each of the I/V amplifiers converts a detection signal (a current signal) to be outputted from the corresponding sensing portion into a voltage signal, and amplifiers the voltage signal for output to the posterior circuit.

In performing the above operation, an inherent noise is generated in each of the I/V amplifiers corresponding to the respective sensing portions. Accordingly, the voltage signals to be outputted from the I/V amplifiers may be deteriorated resulting from the noise. Such amplifier noise is increased, as the number of I/V amplifiers to be used in generation of a signal by a posterior circuit is increased. For instance, in the case where the eight sensing portions shown in FIG. 10D are used, the number of I/V amplifiers affecting amplifier noise which may be superimposed on a reproduction RF signal to be generated by the total sum of light amounts of signal light becomes two times, as compared with a conventional four-division sensor (constituted of four sensing portions). At this time, the S/N (signal to noise ratio) is lowered by 3 dB.

Such a deterioration of a reproduction RF signal is suppressed by reducing the number of I/V amplifiers to be used in generation of a reproduction RF signal. The arrangement for suppressing deterioration of a reproduction RF signal is described by the following example.

EXAMPLE

In this section, an example of the invention based on the above principle is described.

Figure 11:
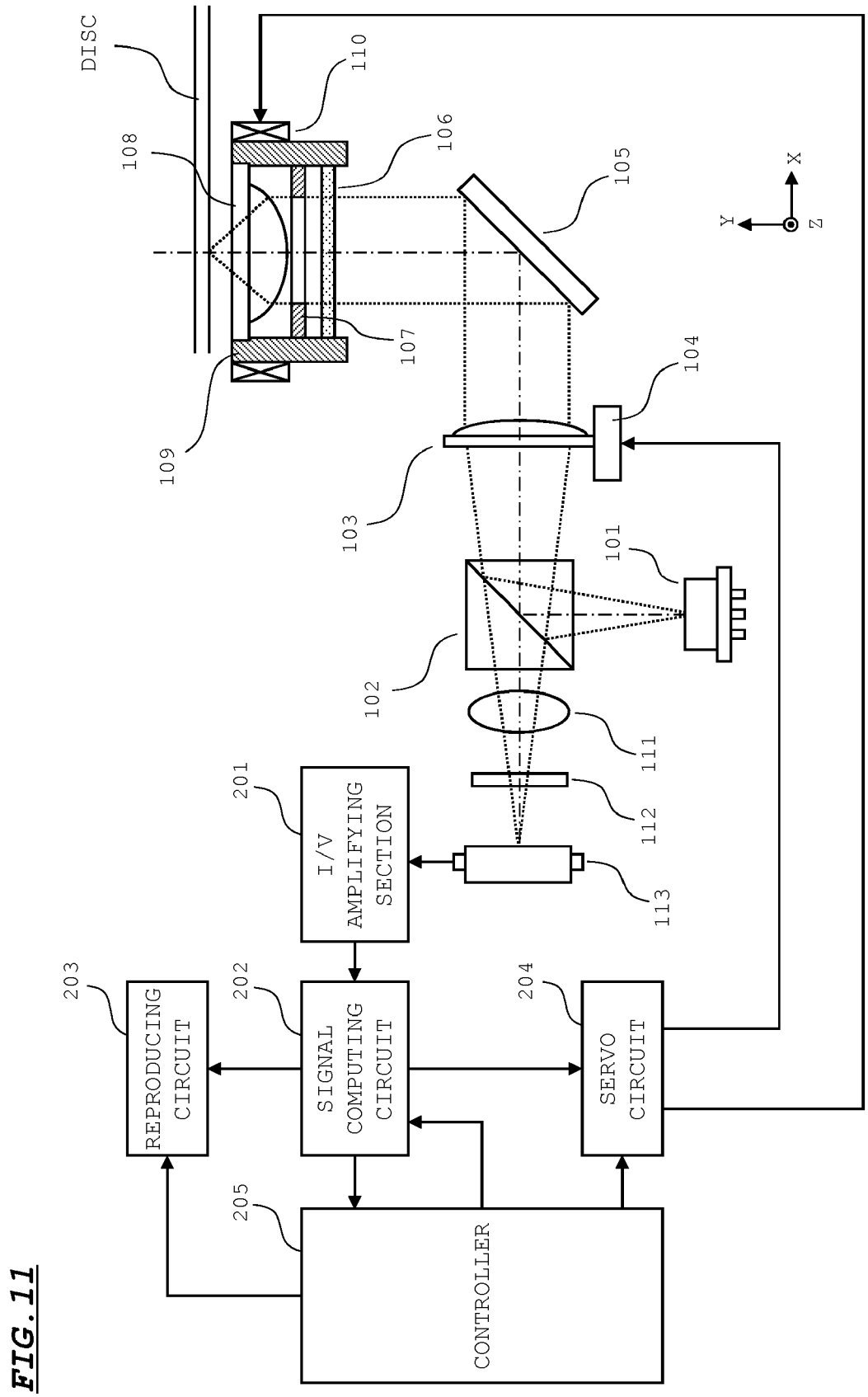
FIG. 11 is a diagram showing an optical system to be used in an optical pickup device in an example of the invention.

FIG. 11 is a diagram showing an optical system in an optical pickup device as an example of the invention. In FIG. 11, a relevant circuit configuration is also shown for convenience of description. A disc in FIG. 11 is formed by laminating plural recording layers.

In FIG. 11, a reproduction circuit 203, a servo circuit 204, and a controller 205 are disposed in an optical disc device loaded with an optical pickup device. An I/V amplifying section 201 may be disposed in the optical pickup device or in the optical disc device. Further alternatively, the entirety or a part of a signal computing circuit 202 may be disposed in the optical pickup device or in the optical disc device. In the case where a photodetector 113 is constituted of a PDIC provided with an IC (Integrated Circuit) section, the I/V amplifying section 201 is included in the IC section of the photodetector 113. In this arrangement, a part of the signal computing circuit 202 may be included in the IC section of the photodetector 113.

As shown in FIG. 11, the optical system of the optical pickup device includes a semiconductor laser 101, a polarized beam splitter 102, a collimator lens 103, a lens actuator 104, a rise-up mirror 105, a quarter wavelength plate 106, an aperture 107, an objective lens 108, a holder 109, an objective lens actuator 110, a detection lens 111, an angle adjuster 112, and a photodetector 113.

The semiconductor laser 101 emits laser light of a predetermined wavelength. The divergence angle of laser light to be emitted from the semiconductor laser 101 is different between the divergence angle in horizontal direction and the divergence angle in vertical direction.

The polarized beam splitter 102 substantially totally reflects laser light (S-polarized light) to be entered from the semiconductor laser 101, and substantially totally transmits laser light (P-polarized light) to be entered from the collimator lens 103. The collimator lens 103 converts laser light to be entered from the polarized beam splitter 102 into parallel light.

The lens actuator 104 displaces the collimator lens 103 in an optical axis direction in accordance with a servo signal to be inputted from a servo circuit 203. Accordingly, aberration in the laser light is corrected. The rise-up mirror 105 reflects the laser light entered from the collimator lens 103 in a direction toward the objective lens 108.

The quarter wavelength plate 106 converts laser light directed to the disc into circularly polarized light, and converts reflection light from the disc into linearly polarized light orthogonal to a polarization direction toward the disc. Accordingly, the laser light reflected on the disc is transmitted through the polarized beam splitter 102.

The aperture 107 adjusts the beam shape of laser light into a circular shape to properly set the effective diameter of laser light with respect to the objective lens 108. The objective lens 108 is so designed as to properly converge laser light onto a targeted recording layer in the disc. The holder 109 integrally holds the quarter wavelength plate 106 and the objective lens 108. The objective lens actuator 110 is constituted of a conventional well-known electromagnetic drive circuit. A coil portion such as a focus coil of the electromagnetic drive circuit is mounted on the holder 109.

The detection lens 111 imparts astigmatism to reflection light from the disc. Specifically, the detection lens 111 corresponds to the astigmatism element shown in FIG. 1A. The detection lens 111 is disposed at such a position that the flat surface direction and the curved surface direction are each inclined with respect to a track image from the disc by 45 degrees.

The angle adjuster 112 has a hologram pattern on a laser light incident surface thereof. In this arrangement, the propagating direction of laser light entered from the side of the detection lens 111 is changed. The angle adjuster 112 will be described later referring to FIGS. 12A and 12B.

The photodetector 113 has a plurality of sensing portions on a light receiving surface thereof. The photodetector 113 is disposed at such a position that the sensing portions are positioned at a position of the plane S0 shown in FIG. 1A. The sensor layout of the photodetector 113 will be described later referring to FIG. 14.

The I/V amplifying section 201 has ten I/V amplifiers (not shown). These I/V amplifiers each converts a detection signal to be outputted from the corresponding sensing portion on the light receiving surface of the photodetector 113 into a voltage signal, and amplifies the voltage signal for output to the signal computing circuit 202.

The signal computing circuit 202 generates a reproduction RF signal, a focus error signal, a push-pull signal (a tracking error signal), and position displacement signals (signals indicating position displacements of the angle adjuster 112 and the photodetector 113) by a computation processing based on the voltage signals to be outputted from the I/V amplifying section 201. A reproduction RF signal is transmitted to the reproduction circuit 203 and the servo circuit 204, a focus error signal and a push-pull signal (a tracking error signal) are transmitted to the servo circuit 204, and position displacement signals are transmitted to the controller 205. Generation of these signals to be performed by the signal computing circuit 202 will be described later referring to FIG. 14.

The reproduction circuit 203 demodulates a reproduction RF signal inputted from the signal computing circuit 202, and generates reproduction data. The servo circuit 204 generates a focus servo signal and a tracking servo signal, based on a focus error signal and a push-pull signal (a tracking error signal) inputted from the signal computing circuit 202, and outputs these signals to an objective lens actuator 110. Further, the servo circuit 204 outputs a servo signal to a lens actuator 104 to optimize the quality of a reproduction RF signal inputted from the signal computing circuit 202. The controller 205 controls the respective parts in accordance with a program stored in an internal memory.

Figure 12A:
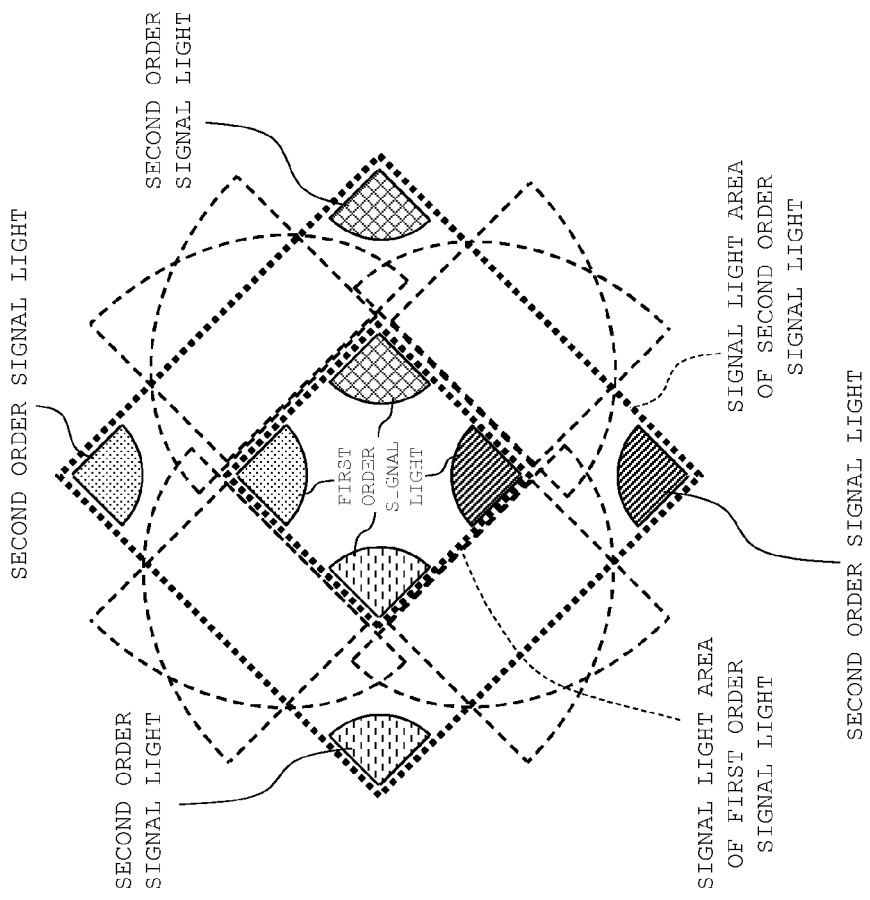
FIG. 12 is a diagram for describing an arrangement of an angle adjuster in the inventive example.

FIG. 12A is a plan view of the angle adjuster 112, when viewed in a propagating direction of reflection light on a disc.

The angle adjuster 112 is formed of a square-shaped transparent plate, and has a blazed-type hologram pattern on the light incident surface thereof. As shown in FIG. 12A, the light incident surface is divided into four hologram areas 112a through 112d. The angle adjuster 112 is disposed posterior to the detection lens 111 so that laser light (signal light, stray light 1, and stray light 2) passing the light flux areas A through D shown in FIG. 9A are entered into the hologram areas 112a through 112d, respectively.

The hologram areas 112a through 112d respectively diffract the incident laser light (signal light, stray light 1, and stray light 2) in directions Va1 through Vd1 by first order diffraction, and in directions Va2 through Vd2 by second order diffraction. The directions Va1 through Vd1 coincide with the directions Da through Dd shown in FIG. 9A, and the directions Va2 through Vd2 also coincide with the directions Da through Dd shown in FIG. 9A. Further, the first order diffraction angles in the respective hologram areas 112a through 112d are identical to each other, and the second order diffraction angles in the respective hologram areas 112a through 112d are identical to each other. The second order diffraction angle is larger than the first order diffraction angle. In this arrangement, laser light (signal light, stray light 1, and the stray light 2) entered from the detection lens 111 is distributed on the light receiving surface of the photodetector 113 by the first order diffraction in the hologram areas 112a through 112d, as shown in FIG. 9B. Further, laser light (signal light, stray light 1, and stray light 2) entered from the detection lens 111 has a larger distribution area on the light receiving surface of the photodetector 113 by the second order diffraction in the hologram areas 112a through 112d, as compared with the distribution area shown in FIG. 9B.

Figure 12B:
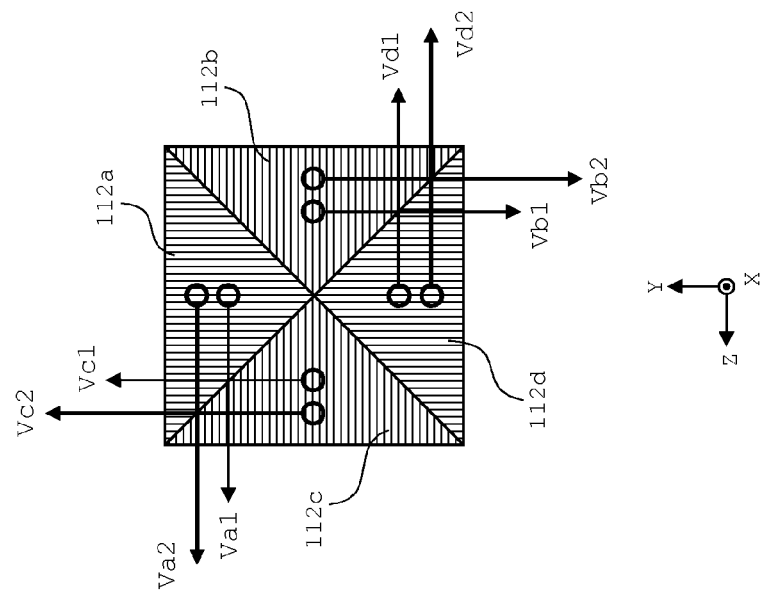

FIG. 12B is a diagram showing a distribution of signal light by diffraction of the angle adjuster 112. In FIG. 12B, the fan-shaped portions enclosed by broken line indicate stray light 1 and stray light 2 by the first order diffraction.

As shown in FIG. 12B, the signal light area of signal light (hereinafter, called as "first order signal light") by the first order diffraction is the same as the signal light area shown in FIG. 9B. On the other hand, the signal light area of signal light (hereinafter, called as "second order signal light") by the second order diffraction is formed on the exterior of the signal light area of the first order signal light. Further, stray light 1 and stray light 2 (not shown) by the second order diffraction is formed on the exterior of the signal light area of the second order signal light.

Figure 13A:
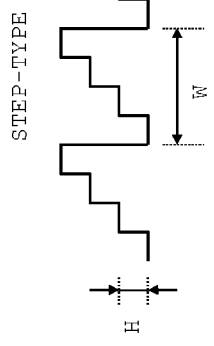
FIGS. 13A through 13D are diagrams for describing a hologram pattern of the angle adjuster in the inventive example.

FIG. 13A is a schematic diagram of a blazed-type hologram pattern. The blazed-type hologram pattern has a diffraction efficiency thereof adjusted by the blaze height H of the hologram pattern, and the diffraction angle thereof adjusted by the pitch W of the hologram pattern.

Figure 13C:
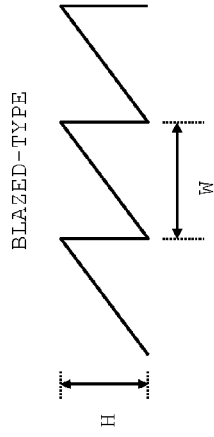
Figure 13B:
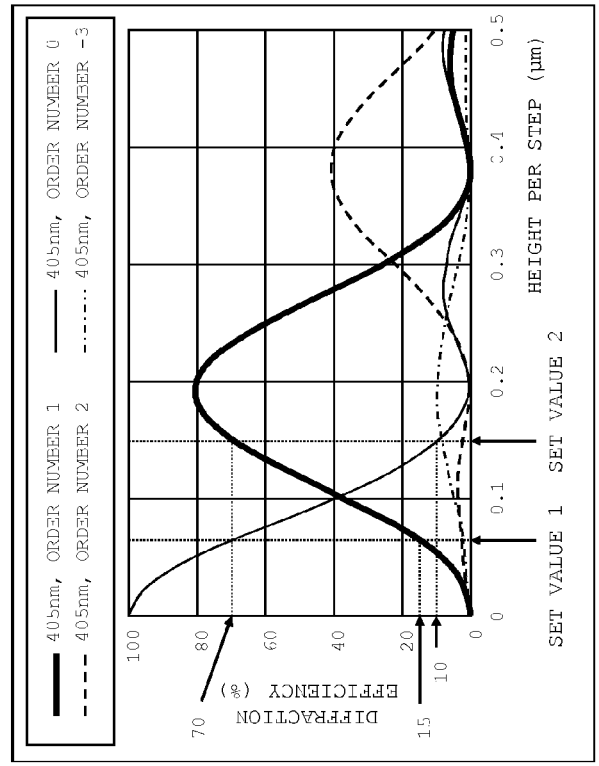

FIG. 13B is a diagram showing a relation between the blaze height and the diffraction efficiency of the blazed-type hologram pattern. The blaze height H of the hologram pattern formed in the angle adjuster 112 is set to a "set value" shown in FIG. 13B. In this example, the diffraction efficiency of the first order diffraction light by the angle adjuster 112 is 9%, and the diffraction efficiency of the second order diffraction light by the angle adjuster 112 is 83%.

Figure 14:
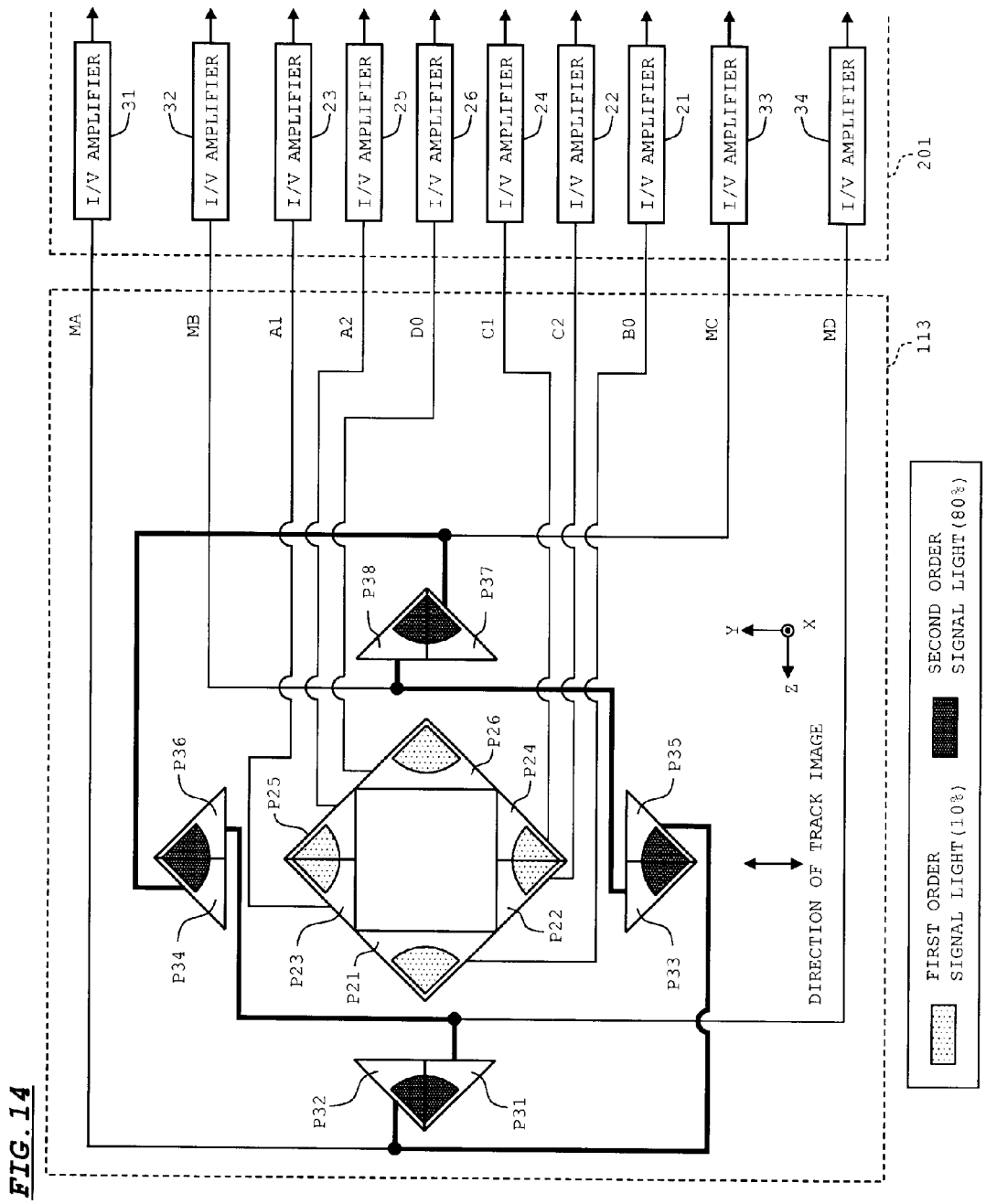
FIG. 14 is a diagram showing an arrangement of a sensor layout in the inventive example.

FIG. 14 is a diagram showing a sensor layout formed in the light receiving surface of the photodetector 113. In FIG. 14, the I/V amplifiers 21 through 26, and 31 through 34 in the I/V amplifying section 201 are also shown.

As shown in FIG. 14, sensing portions P21 through P26 for receiving the first order signal light shown in FIG. 12B, and sensing portions P31 through P 38 for receiving the second order signal light shown in FIG. 12B are disposed on the light receiving surface of the photodetector 113. The pitch W of the hologram pattern is set to such a value that the first order signal light and the second order signal are respectively received on the sensing portions P21 through P26, and on the sensing portions P31 through P38.

The sensing portion P21 has such a size as to receive laser light of a light amount substantially equal to the sum of light amounts of laser light to be entered into the sensing portions P11 and P12 shown in FIG. 10D. Similarly, the sensing portion P26 has such a size as to receive laser light of a light amount substantially equal to the sum of light amounts of laser light to be entered into the sensing portions P17 and P18 shown in FIG. 10D. The sensing portions P32 and P35, the sensing portions P33 and P38, the sensing portions P34 and P37, and the sensing portions P31 and P36 are short-circuited so that detection signals to be outputted from the sensing portions P32 and P35, detection signals to be outputted from the sensing portions P33 and P38, detection signals to be outputted from the sensing portions P34 and P37, and detection signals to be outputted from the sensing portions P31 and P36 are summed up.

Six detection signals B0, C2, A1, C1, A2, and D0 to be outputted from the sensing portions P21 through P26 are respectively inputted to the I/V amplifiers 21 through 26 in the I/V amplifying section 201. Four detection signals MA, MB, MC, and MD to be outputted from the sensing portions P32 and P35, the sensing portions P33 and P38, the sensing portions P34 and P37, and the sensing portions P31 and P36 are respectively inputted to the I/V amplifiers 31 through 34 in the I/V amplifying section 201. Voltage signals to be outputted from the respective I/V amplifiers are used in computation to be performed by the signal computing circuit 202, which will be described later.

Next, computation to be performed by the signal computing circuit 202 is described. In the following equations, voltage signals to be used in the computation are indicated with the same symbols as the symbols representing current signals which undergo I/V amplifiers to simplify the description.

A reproduction RF signal, a focus error signal FE for suppressing disturbance resulting from crossing a groove, a tracking error signal DPP by a DPP (Differential Push-Pull) method, a position displacement signal PD1 of the photodetector 113 in positive Z axis direction, a position displacement signal PD2 of the photodetector 113 in negative Y-axis direction, a position displacement signal HOE1 of the angle adjuster 112 in negative Y-axis direction, and a position displacement signal HOE2 in positive Z-axis direction are respectively calculated by the following equations.

$$RF = MA + MB + MC + MD$$

$$FE = \{(MA+MC) - (MB+MD)\} + k1\{(A1+C1) - (A2+C2)\}$$

$$DPP = \{(MA+MD) - (MB+MC)\} + k2\{(A1+C2) - (A2+C1)\}$$

$$PD1 = \{(MA+MD) - (MB+MC)\} / \{(MA+MD) + (MB+MC)\}$$

$$PD2 = \{(MA+MB) - (MC+MD)\} / \{(MA+MB) + (MC+MD)\}$$

$$HOE1 = (B0 - D0)/(B0 + D0)$$

$$HOE2 = \{(C1+C2) - (A1+A2)\} / \{(C1+C2) + (A1+A2)\}$$

By adjusting the factors k1 and k2 in the above equations, disturbance resulting from crossing a groove in the focus error signal is suppressed, and a DC component in the tracking error signal DPP is suppressed. The adjusting method of the factor k1, and the manner as to how disturbance resulting from crossing a groove is suppressed by the computation of the focus error signal FE are described in Japanese Patent Application No. 2009-013592 filed by the applicant of the present application. Further, the adjusting method of the factor k2, and the manner as to how a DC component is suppressed by the computation of the tracking error signal DPP are described in U.S. patent application Ser. No. 12/567,299 filed by the applicant of the present application.

Further, the position of the photodetector 113 is adjusted so that the values of the position displacement signals PD1 and PD2 are equal to zero, and the position of the angle adjuster 112 is adjusted so that the values of the position displacement signal HOE1 and HOE2 are equal to zero. Specifically, at the time of producing an optical pickup device, these signals are transmitted to a test device. Then, these signals are monitored by a manufacturer, and the positions of the photodetector 113 and the angle adjuster 112 are adjusted so that the values of these signals are equal to zero. The position adjusting method of the photodetector 113 and the angle adjuster 112 using these signals is described in Japanese Patent Application No. 2009-177046 filed by the applicant of the present application.

In addition to the above equations, a tracking error signal DPD by a DPD (Differential Phase Detection) method is calculated by using the detection signals MA through MD by a conventional and well-known computation.

As described above, in the inventive example, it is possible to suppress overlapping of signal light reflected on a target recording layer out of the recording layers formed in a disc, and stray light 1 and stray light 2 respectively reflected on an upper recording layer and a lower recording layer with respect to the target recording layer, on the light receiving surface (the plane S0 where a beam spot of signal light becomes a least circle of confusion in an on-focus state) of the photodetector 113. Specifically, it is possible to make the distribution state of signal light, stray light 1, and stray light 2 on the light receiving surface (the plane S0) coincide with the state shown in FIG. 12B. Therefore, it is possible to properly receive corresponding signal light on the sensing portions P21 through P26, and P31 through P38 by disposing the sensing portions shown in FIG. 14 on the signal light area of the first order signal light, and the signal light area of the second order signal light shown in FIG. 12B. This enables to suppress deterioration of detection signals resulting from stray light.

As is obvious from the description referring to FIG. 12B, stray light is not superimposed on the signal light area of the first order signal light. Accordingly, it is possible to avoid incidence of stray light into the sensing portions P21 through P26 shown in FIG. 14. On the other hand, in an actual state, the area of stray light by the first order diffraction shown in FIG. 12B is larger than the area shown by broken line in FIG. 12B. Therefore, stray light by the first order diffraction may be entered into the irradiation area of the second order signal light. However, in this case, similarly to the above case, since the diffraction efficiency of the first order diffraction light is suppressed to about 9%, the intensity of stray light by the first order diffraction is remarkably reduced, as compared with the intensity of the second order signal light. Accordingly, the above arrangement enables to output a signal with no or less influence of stray light by the first order diffraction from the sensing portions P31 through P38 shown in FIG. 14.

In addition to the above, in the inventive example, as shown in FIG. 14, detection signals outputted from the sensing portions P21 through P26 for receiving the first order signal light are inputted to the six I/V amplifiers 21 through 26, and detection signals outputted from the sensing portions P31 through P38 for receiving the second order signal light are inputted to the four I/V amplifiers 31 through 34. Thus, the computation by the above equations is performed, based on the voltage signals outputted from the respective I/V amplifiers. In this arrangement, only the amplifier noise resulting from the four I/V amplifiers 31 through 34 is superimposed on the voltage signals obtained by I/V conversion of the detection signals MA through MD to be used in generation of a reproduction RF signal. Accordingly, amplifier noise which may be superimposed on a reproduction RF signal is reduced, as compared with a case that a reproduction RF signal is generated based on voltage signals obtained by subjecting the output signals from the eight sensing portions P11 through P18 shown in FIG. 18 to I/V conversion by eight I/V amplifiers, whereby a more high precision reproduction RF signal can be obtained.

In the inventive example, as shown in FIG. 14, since the sensing portions P11 and P12 shown in FIG. 10D are integrally formed into the sensing portion P21, and the sensing portions P17 and P18 shown in FIG. 10D are integrally formed into the sensing portion P26, amplifier noise which may be superimposed on the position displacement signal HOE1 is also reduced.

Further, it is possible to obtain the above advantage only by disposing the angle adjuster 112 on the optical path of laser light reflected on a disc, in other words, between the detection lens 111 and the photodetector 113 in the arrangement shown in FIG. 11. Accordingly, the inventive example is advantageous in effectively removing an influence resulting from stray light with a simplified arrangement, and suppresses amplifier noise which may be superimposed on a voltage signal to be used in signal computation.

Figure 15:
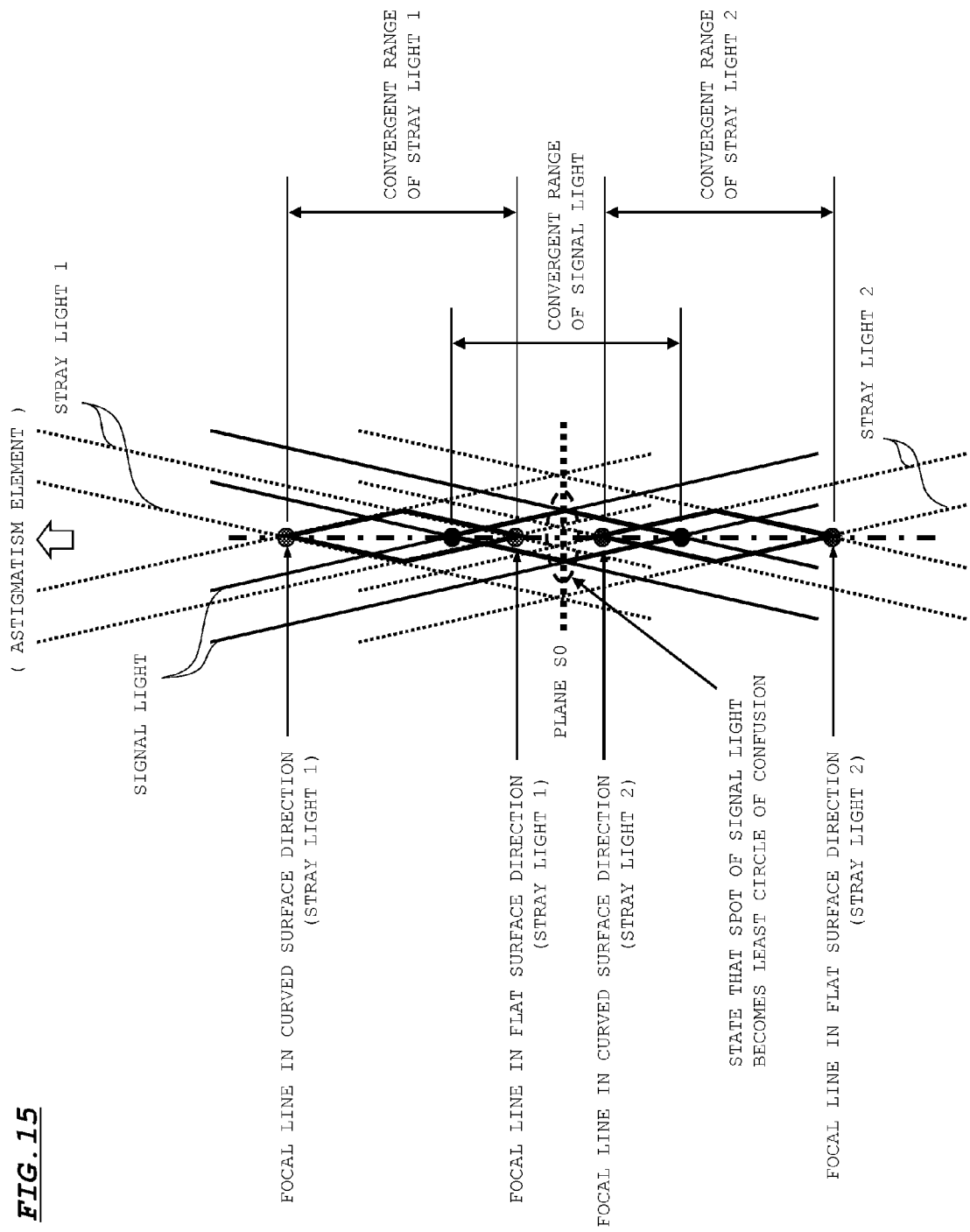
FIG. 15 is a diagram showing the inventive example, and a preferred application range of the technical principle of the invention.

The effect of removing stray light based on the above principle is obtained, as shown in FIG. 15, when the focal line position of stray light 1 in the flat surface direction is closer to the astigmatism element with respect to the plane S0 (a plane where the beam spot of signal light becomes a least circle of confusion), and the focal line position of stray light 2 in the curved surface direction is away from the astigmatism element with respect to the plane S0. Specifically, as far as the above relation is satisfied, the distribution of signal light, stray light 1, and stray light 2 can be made in the states as shown in FIGS. 8A through 8D, which enables to avoid a likelihood that signal light, stray light 1, and stray light 2 may be superimposed one over the other on the plane S0. In other words, as far as the above relation is satisfied, even if the focal line position of stray light 1 in the flat surface direction is moved closer to the plane S0 than the focal line position of signal light in the curved surface direction, or even if the focal line position of stray light 2 in the curved surface direction is moved closer to the plane S0 than the focal line position of signal light in the flat surface direction, the effect of the invention and the example based on the above principle can be obtained.

MODIFICATION EXAMPLE

In the inventive example, the angle adjuster 112 having a blazed-type hologram pattern is used. Alternatively, an angle adjuster 112 having a step-type hologram pattern may be used. Further, in the inventive example, first order signal light and second order signal light are received on the photodetector 113. Alternatively, signal light having other two diffraction orders maybe received on the photodetector 113.

In the following, there is described an arrangement example, wherein signal light by zero-th order diffraction and signal light by first order diffraction are received on the photodetector 113 by using the angle adjuster 112 having a step-type hologram pattern.

FIG. 13C is a schematic diagram of a step-type hologram pattern. In the step-type hologram pattern, the diffraction efficiency is adjusted by the number of steps and the height H per step of the hologram pattern; and the diffraction angle is adjusted by the pitch W of the hologram pattern. In modification examples, a four-step hologram is used.

Figure 13D:
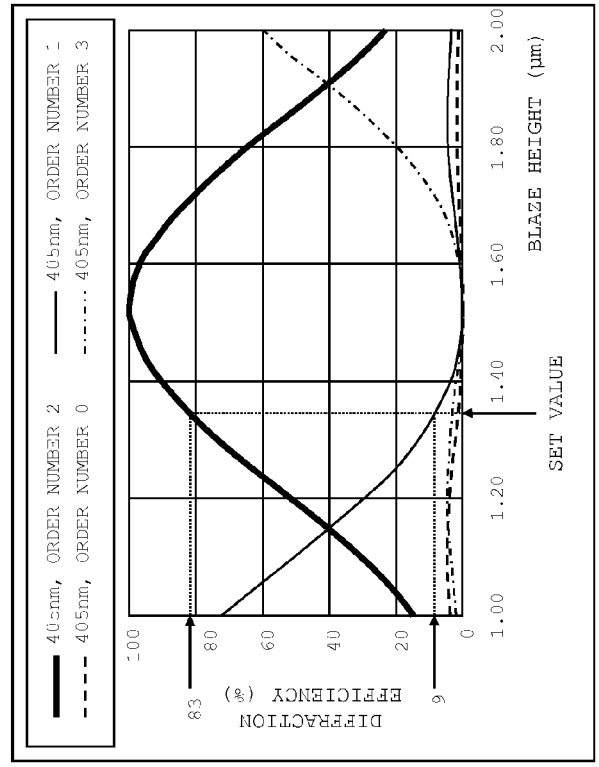

FIG. 13D is a diagram showing a relation between the height per step and the diffraction efficiency of the four-step hologram. In the modification examples, the height H per step is set to a "set value 1" so that the diffraction efficiency of zero-th order diffraction light by the angle adjuster 112 becomes 70%, and the diffraction efficiency of first-order diffraction light by the angle adjuster 112 becomes 15%. Alternatively, the height H per step may be set to a "set value 2" so that the diffraction efficiency of zero-th order diffraction light by the angle adjuster 112 becomes 10%, and the diffraction efficiency of first-order diffraction light by the angle adjuster 112 becomes 70%, although the use efficiency of diffraction light with respect to laser light to be entered into the hologram is lowered.

Figure 16A:
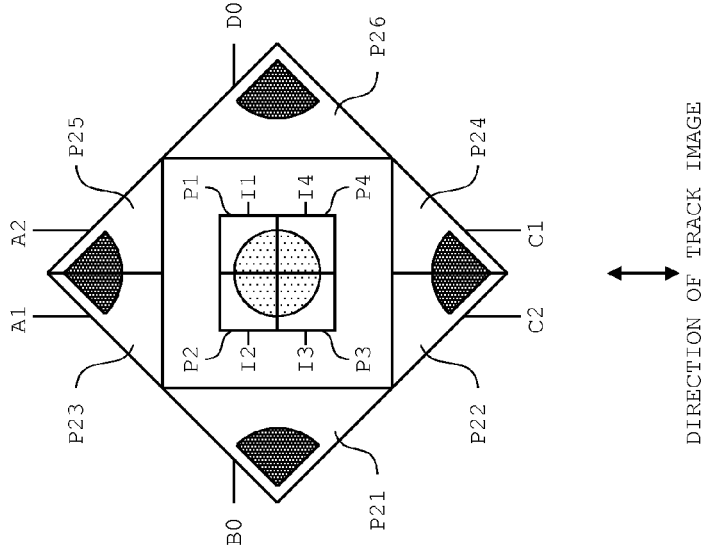
FIGS. 16A and 16B are diagrams showing arrangements of sensor layouts as modification examples.
Figure 16B:
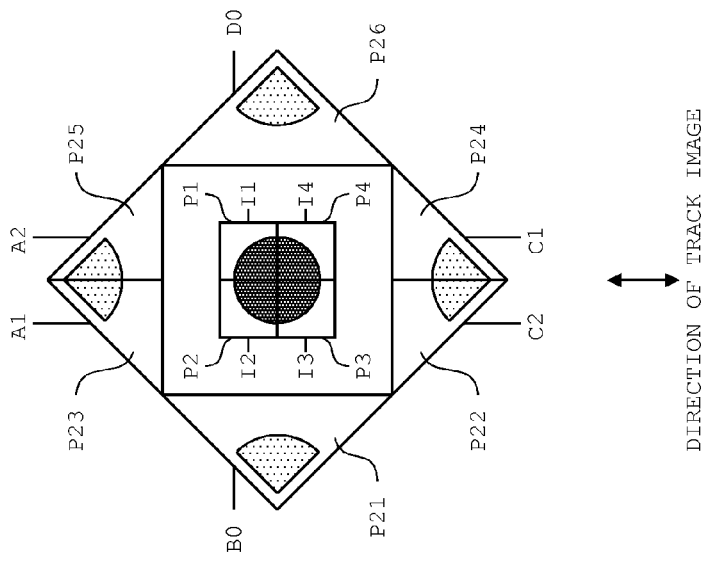

FIGS. 16A and 16B are diagrams showing sensor layouts formed on a light receiving surface of the photodetector 113 in the modification examples. FIGS. 16A and 16B are diagrams, wherein the height H per step is respectively set to the "set value 1" and the "set value 2" shown in FIG. 13D. Since the sensor layouts shown in FIGS. 16A and 16B are identical to each other, hereinafter, the sensor layout is described only referring to FIG. 16A.

Referring to FIG. 16A, the conventional four-division sensor constituted of the sensing portions P1 through P4 is disposed on a central area in an inner position with respect to the sensing portions P21 through P26 on the light receiving surface of the photodetector 113, in addition to the sensing portions P21 through P26 for receiving the first order signal light described in the inventive example. The sensing portions P1 through P4 receive signal light (hereinafter, called as "zero-th order signal light") by zero-th order diffraction. The pitch W of the hologram pattern is set to such a value that the distribution of the first order signal light coincides with the positions of the sensing portions P21 through P26.

Detection signals I1 through I4 to be outputted from the sensing portions P1 through P4 are inputted to respective I/V amplifiers (not shown) in an I/V amplifying section 201. Voltage signals to be outputted from the respective I/V amplifiers are used for computation to be performed by a signal computing circuit 202.

Next, the computation to be performed by the signal computing circuit 202 is described. In the following equations, voltage signals to be used in the computation are indicated with the same symbols as the symbols representing current signals which undergo I/V amplifiers to simplify the description.

The reproduction RF signal to be generated from the sensor layout shown in FIG. 16A is calculated by the following equation.

$$RF=I1+I2+I3+I4$$

The reproduction RF signal to be generated from the sensor layout shown in FIG. 16B is calculated by the following equation.

$$RF=A1+A2+B0+C1+C2+D0$$

In addition to the above, a focus error signal FE for suppressing disturbance resulting from crossing a groove, a tracking error signal DPP by a DPP (Differential Push-Pull) method, a position displacement signal PD1 of the photodetector 113 in positive Z axis direction, a position displacement signal PD2 of the photodetector 113 in negative Y-axis direction, a position displacement signal HOE1 of the angle adjuster 112 in negative Y-axis direction, and a position displacement signal HOE2 of the angle adjuster 112 in positive Z-axis direction are respectively calculated by the following equations, which are common between the sensor layouts shown in FIGS. 16A and 16B.

$$FE=\{(I1+I3)-(I2+I4)\}+k1\{(A1+C1)-(A2+C2)\}$$

$$DPP=\{(I1+I4)-(I2+I3)\}+k2\{(A1+C2)-(A2+C1)\}$$

$$PD1=\{(I1+I4)-(I2+I3)\}/\{(I1+I4)+(I2+I3)\}$$

$$PD2=\{(I1+I2)-(I3+I4)\}/\{(I1+I2)+(I3+I4)\}$$

$$HOE1=(B0-D0)/(B0+D0)$$

$$HOE2=\{(C1-PC2)-(A1+A2)\}/\{(C1-PC2)+(A1+A2)\}$$

By adjusting the factors k1 and k2 in the above equations, disturbance resulting from crossing a groove in the focus error signal is suppressed, and a DC component in the tracking error signal DPP is suppressed.

The adjusting method of the factor k1, and the manner as to how disturbance resulting from crossing a groove is suppressed by the computation of the focus error signal FE are described in Japanese Patent Application No. 2009-013592 filed by the applicant of the present application. Further, the adjusting method of the factor k2, and the manner as to how a DC component is suppressed by the computation of the tracking error signal DPP are described in U.S. patent application Ser. No. 12/567,299 filed by the applicant of the present application. Further, the positions of the photodetector 113 and the angle adjuster 112 are adjusted by using the position displacement signals PD1, PD2, HOE1, and HOE2 (see Japanese Patent Application No. 2009-177046).

In addition to the above equations, a tracking error signal DPD by a DPD (Differential Phase Detection) method is calculated by using the detection signals MA through MD by a conventional and well-known computation.

As described above, in the modification examples as well as in the inventive example, it is possible to suppress deterioration of detection signals resulting from stray light. However, in both of the two modification examples shown in FIGS. 16A and 16B, stray light by the zero-th order diffraction may be entered into all of the sensing portions. In the modification example shown in FIG. 16A, since the diffraction efficiency of zero-th order diffraction light is set high, an influence resulting from stray light is large. On the other hand, in the modification example shown in FIG. 16B, since the diffraction efficiency of zero-th order diffraction light is set low, an influence resulting from stray light is small. Accordingly, in the two modification examples, the modification example shown in FIG. 16B is advantageous in obtaining a more high precision signal.

In addition to the above, in the modification examples, as shown in FIGS. 16A and 16B, detection signals outputted from the sensing portions P1 through P4 for receiving the zero-th order signal light are inputted to the four I/V amplifiers, and detection signals outputted from the sensing portions P21 through P26 for receiving the first order signal light are inputted to the six I/V amplifiers. As described above, the computation by the above-mentioned equations is performed, based on the voltage signals outputted form the respective I/V amplifiers. By performing the above operation, for instance, only amplifier noise resulting from the four I/V amplifiers is superimposed on the detection signals I1 through I4 to be used in generation of a reproduction RF signal in the modification example shown in FIG. 16A. Further, only amplifier noise resulting from the six I/V amplifiers is superimposed on the detection signals A1, A2, B0, C1, C2, and D0 to be used in generation of a reproduction RF signal in the modification example shown in FIG. 16B. Accordingly, since amplifier noise which may be superimposed on a reproduction RF signal is reduced, as compared with the arrangement shown in FIG. 10D, a more high precision reproduction RF signal can be obtained.

Further, in the modification examples, the laser light use efficiencies of the angle adjuster 112 are 85% in the modification example shown in FIG. 16A, and 80% in the modification example shown in FIG. 16B, which are slightly lower than the light use efficiency of 90% in the inventive example. However, since the angle adjuster 112 is formed of a step-type hologram pattern in the modification examples, a more inexpensive angle adjuster 112 can be produced, as compared with a case that a blazed-type hologram pattern is used as in the inventive example.

In the foregoing, an inventive example and a modification of the inventive example have been described. The invention is not limited to the inventive example and the modification of the inventive example, and the embodiment of the invention may be modified in various ways other than the above.

For instance, in the inventive example and the modification examples, the hologram areas 112a through 112d have only a diffracting function i.e. an angle imparting function of changing the propagating direction of laser light by a predetermined angle. Alternatively, the hologram areas 112a through 112d may be formed with a hologram pattern having an astigmatism function by the detection lens 111, in addition to the angle imparting function. Further alternatively, a hologram pattern having the angle imparting function may be formed on a light incident surface of the angle adjuster 112, and a hologram pattern having an astigmatism function may be formed on a light output surface of the angle adjuster 112. The modification is advantageous in omitting the detection lens 111, and reducing the number of parts and the production cost.

In the inventive example, the detection signals B0 and D0 to be outputted from the sensing portions P21 and P26 are used only by the arithmetic expression for calculating the position displacement signals HOE1 and HOE2 of the angle adjuster 112. Accordingly, as far as there is no need of generating a position displacement signal of the angle adjuster 112, the sensing portions P21 and P26 can be omitted, thereby simplifying the sensor layout.

Further, in the modification examples, as described above, stray light by zero-th order diffraction may be entered into the sensing portions P21 through P26, in addition to the sensing portions P1 through P4. In the case where deterioration of detection signals from the sensing portions P21 through P26 resulting from incidence of stray light by zero-th order diffraction becomes a problem, as described above, it is possible to increase the diffraction angle of the angle adjuster 112, and set the positions of the sensing portions P21 through P26 further away in the outer position with respect to the positions of the sensing portions P1 through P4. This enables to reduce the light amounts of stray light 1 and stray light 2 by zero-th order diffraction, which may be entered into the sensing portions P21 through P26, while receiving the first order signal light on the sensing portions P21 through P26. Further, in the above arrangement, the diffraction efficiency of the angle adjuster 112 may be adjusted. For instance, if the diffraction efficiency of zero-th order diffraction light is set to a small value, it is possible to reduce the light amounts of stray light 1 and stray light 2 by zero-th order diffraction, which may be entered into the sensing portions P21 through P26.

Further, in the modification examples, as described above, the tracking signal DPP by the DPP method is set. Alternatively, in the case where deterioration of the detection signals I1 through I4 resulting from stray light 1 and stray light 2 by zero-th order diffraction, which may be entered into the sensing portions P1 through P4, becomes a problem, the signal DPP may be calculated by the following equation.

$$DPP=\{(B0-D0)\}+k\{(A1+C2)-(A2+C1)\}$$

Further alternatively, the sensing portions P22 and P23, and the sensing portions P24 and P25 shown in FIGS. 16A and 16B in the modification examples may be short-circuited. In the above modification, a focus error signal is calculated by the conventional focus error signal FE described referring to FIG. 10B by using the sensing portions P1 through P4. The above modification is further advantageous in reducing amplifier noise resulting from I/V amplifiers, which maybe superimposed on detection signals, although it is impossible to generate a focus error signal for suppressing disturbance resulting from crossing a groove.

Further, in the inventive example and the modification examples, the blaze height of a blazed-type hologram pattern is not limited to the "set value" shown in FIG. 13B, and the height per step of the step-type hologram pattern is not limited to the "set value 1" and the ""set value 2" shown in FIG. 13D. Furthermore, the number of steps of the step-type hologram pattern is not limited to four. Specifically, as far as signal light is received on the sensor layout of the photodetector 113, the configuration of these hologram patterns may be changed, as necessary.

Further, in the embodiment, there is described an arrangement, wherein four or six detection signals are outputted from a sensor group for generating a reproduction RF signal. Alternatively, detection signals of the number less than eight maybe generated from the sensor group. For instance, the sensing portions P32 and P34, and the sensing portions P35 and P37 may be short-circuited so that the signal MA and the signal MC shown in FIG. 14 are summed up. Further alternatively, the sensing portions P31 and P33, and the sensing portions P36 and P38 may be short-circuited so that the signal MB and the signal MD shown in FIG. 14 are summed up. In the above modification, a focus error signal is generated in the similar manner as in the embodiment, and a tracking error signal is generated based on detection signals from the sensing portions P21 through P26. This enables to set the number of I/V amplifiers to be used in generation of a reproduction RF signal to two, which is further advantageous in reducing an influence of amplifier noise with respect to a reproduction RF signal.

Further alternatively, all the sensing portions P31 through P38 shown in FIG. 14 may be short-circuited so that one detection signal is outputted from the sensing portions P31 through P38. In the modification, the one detection signal is subjected to I/V conversion to generate a reproduction RF signal. In the above modification, however, since it is necessary to generate a focus error signal and a tracking error signal based on first order signal light, it is necessary to dispose the eight sensing portions shown in FIG. 10D in an inner position with respect to the sensing portions P31 through P38. Further, the diffraction efficiencies of the first order signal light and the second order signal light are adjusted, as necessary.

Further alternatively, the sensing portions P1 and P3 shown in FIGS. 16A and 16B may be short-circuited, and the sensing portions P2 and P4 shown in FIGS. 16A and 16B may also be short-circuited. In this modification, similarly to the above modification, the eight sensing portions shown in FIGS. 10D are disposed in an outer position with respect to the sensing portions P1 through P4.

In the inventive example and the modification examples, the intensity of signal light to be used in generation of a reproduction RF signal is attenuated by diffraction. As a result, the amplitude of the reproduction RF signal is lowered, as compared with a case where there is no attenuation. However, since noise resulting from I/V conversion is reduced in the inventive example and the modification examples, an influence of noise with respect to the amplitude of the reproduction RF signal can be suppressed, as compared with a case where the signal light shown in FIG. 10C is received by the sensing portions shown in FIG. 10D, despite lowering of the amplitude of the reproduction RF signal.

The embodiment of the invention may be changed or modified in various ways as necessary, as far as such changes and modifications do not depart from the scope of the claims of the invention hereinafter defined.

What is claimed is:

1. An optical pickup device comprising:
   a laser light source;
   an objective lens which converges laser light emitted from the laser light source on a recording medium;
   an astigmatism element which imparts astigmatism to the laser light reflected on the recording medium to set a first focal line position to be defined by convergence of the laser light in a first direction, and a second focal line position to be defined by convergence of the laser light in a second direction perpendicular to the first direction away from each other in a propagating direction of the laser light;

a diffraction element which diffracts four light fluxes obtained by dividing a light flux of the laser light reflected on the recording medium by a first straight line and a second straight line respectively in parallel to the first direction and the second direction to disperse the four diffracted light fluxes from each other; and a photodetector including a first sensing section and a second sensing section which respectively receive m-th order diffraction light and n-th order diffraction light (where m≠n) of the four light fluxes, wherein the first sensing section is configured to receive eight light fluxes obtained by dividing the four light fluxes of the m-th order diffraction light by two straight lines respectively intersecting with the first straight line and the second straight line by 45° to output detection signals of the number less than eight.

2. The optical pickup device according to claim 1, wherein the first sensing section receives the eight light fluxes obtained by dividing the four light fluxes of the m-th order diffraction light to output four detection signals.

3. The optical pickup device according to claim 2, wherein the first sensing section includes eight sensors which individually receive the respective eight light fluxes, corresponding two sensors of the eight sensors being short-circuited to output the four detection signals.

4. The optical pickup device according to claim 1, wherein the second sensing section receives diffraction light other than zero-th order diffraction light, and the first sensing section receives diffraction light having a diffraction direction identical to a diffraction direction of the diffraction light to be received by the second sensing section and having a diffraction angle larger than a diffraction angle of the diffraction light to be received by the second sensing section.

5. The optical pickup device according to claim 1, wherein the second sensing section includes four sensors which receive zero-th order diffraction light, and the first sensing section receives diffraction light of the first order or higher.

6. An optical disc device comprising:
an optical pickup device; and
a signal processor,
the optical pickup device including:
a laser light source;
an objective lens which converges laser light emitted from the laser light source on a recording medium;
an astigmatism element which imparts astigmatism to the laser light reflected on the recording medium to set a first focal line position to be defined by convergence of the laser light in a first direction, and a second focal line position to be defined by convergence of the laser light in a second direction perpendicular to the first direction away from each other in a propagating direction of the laser light;

a diffraction element which diffracts four light fluxes obtained by dividing a light flux of the laser light reflected on the recording medium by a first straight line and a second straight line respectively in parallel to the first direction and the second direction to disperse the four diffracted light fluxes from each other; and a photodetector including a first sensing section and a second sensing section which respectively receive m-th order diffraction light and n-th order diffraction light (where m≠n) of the four light fluxes, wherein the first sensing section is configured to receive eight light fluxes obtained by dividing the four light fluxes of the m-th order diffraction light by two straight lines respectively intersecting with the first straight line and the second straight line by 45° to output detection signals of the number less than eight, the signal processor converts a detection signal to be outputted from the first sensing section and a detection signal to be outputted from the second sensing section into voltage signals, and performs computation with respect to the voltage signals, and the signal processor includes a reproduction signal generating section which generates a reproduction RF signal, based on the voltage signals derived from the detection signal from the first sensing section.

7. The optical disc device according to claim 6, wherein the first sensing section receives the eight light fluxes obtained by dividing the four light fluxes of the m-th order diffraction light to output four detection signals.

8. The optical disc device according to claim 7, wherein the first sensing section includes eight sensors which individually receive the respective eight light fluxes, corresponding two sensors of the eight sensors being short-circuited to output the four detection signals.

9. The optical disc device according to claim 6, wherein the second sensing section receives diffraction light other than zero-th order diffraction light, and the first sensing section receives diffraction light having a diffraction direction identical to a diffraction direction of the diffraction light to be received by the second sensing section and having a diffraction angle larger than a diffraction angle of the diffraction light to be received by the second sensing section.

10. The optical disc device according to claim 6, wherein the second sensing section includes four sensors which receive zero-th order diffraction light, and the first sensing section receives diffraction light of the first order or higher.

* * * * *